(12) United States Patent
Jiang

(10) Patent No.: US 7,721,071 B2
(45) Date of Patent: May 18, 2010

(54) SYSTEM AND METHOD FOR PROPAGATING OPERAND AVAILABILITY PREDICTION BITS WITH INSTRUCTIONS THROUGH A PIPELINE IN AN OUT-OF-ORDER PROCESSOR

(75) Inventor: Xing Yu Jiang, Palo Alto, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 11/362,764

(22) Filed: Feb. 28, 2006

(65) Prior Publication Data
US 2007/0204135 A1    Aug. 30, 2007

(51) Int. Cl.
G06F 9/30    (2006.01)
(52) U.S. Cl. .................... 712/217; 712/214
(58) Field of Classification Search ............. 712/214, 712/216, 217, 218, 219
See application file for complete search history.

(56) References Cited

U.S. PATENT DOCUMENTS

| | | | |
|---|---|---|---|
| 5,091,851 A | 2/1992 | Shelton et al. | |
| 5,109,520 A | 4/1992 | Knierim | |
| 5,325,511 A | 6/1994 | Collins et al. | |
| 5,493,523 A | 2/1996 | Huffman | |
| 5,493,667 A | 2/1996 | Huck et al. | |
| 5,510,934 A | 4/1996 | Brennan et al. | |
| 5,526,504 A | 6/1996 | Hsu et al. | |
| 5,537,538 A | 7/1996 | Bratt et al. | |
| 5,546,545 A | 8/1996 | Rich | |
| 5,555,432 A * | 9/1996 | Hinton et al. ........... | 712/23 |
| 5,568,630 A | 10/1996 | Killian et al. | |
| 5,572,704 A | 11/1996 | Bratt et al. | |
| 5,586,278 A | 12/1996 | Papworth et al. | |
| 5,604,909 A | 2/1997 | Joshi et al. | |
| 5,606,683 A | 2/1997 | Riordan | |
| 5,632,025 A | 5/1997 | Bratt et al. | |
| 5,670,898 A | 9/1997 | Fang | |
| 5,734,881 A | 3/1998 | White et al. | |
| 5,740,402 A | 4/1998 | Bratt et al. | |

(Continued)

FOREIGN PATENT DOCUMENTS

GB    2322718 A    9/1998

(Continued)

OTHER PUBLICATIONS

Hennessy and Patterson, "Computer Architecture—A Quantitative Approach, 2nd Edition," 1996, p. 247.*

(Continued)

*Primary Examiner*—David J Huisman
(74) *Attorney, Agent, or Firm*—Sterne, Kessler, Goldstein & Fox PLLC

(57) ABSTRACT

A processor core and a method for distributive scoreboard scheduling in an out-of-order processor pipeline are described herein. In an embodiment, control logic appends operand availability bits to each instruction. The appended operand availability bits form a distributive scoreboard for each instruction. The appended operand availability bits are propagated together with the instruction through multiple stages of the processor pipeline. An instruction dispatch buffer stores the instruction and the operand availability bits. A dispatch controller determines when an instruction is to be issued. The determination is based, at least in part, on the operand availability bits stored in the instruction dispatch buffer.

27 Claims, 10 Drawing Sheets

U.S. PATENT DOCUMENTS

| | | | |
|---|---|---|---|
| 5,758,112 | A | 5/1998 | Yeager et al. |
| 5,764,999 | A | 6/1998 | Wilcox et al. |
| 5,765,037 | A * | 6/1998 | Morrison et al. ............ 713/502 |
| 5,781,753 | A | 7/1998 | McFarland et al. |
| 5,784,584 | A | 7/1998 | Moore et al. |
| 5,799,165 | A | 8/1998 | Favor et al. |
| 5,802,339 | A | 9/1998 | Sowadsky et al. |
| 5,802,386 | A * | 9/1998 | Kahle et al. .................... 712/23 |
| 5,809,336 | A | 9/1998 | Moore et al. |
| 5,881,257 | A | 3/1999 | Glass et al. |
| 5,884,061 | A | 3/1999 | Hesson et al. |
| 5,954,815 | A | 9/1999 | Joshi et al. |
| 5,961,629 | A | 10/1999 | Nguyen et al. |
| 5,966,734 | A | 10/1999 | Mohamed et al. |
| 6,044,478 | A | 3/2000 | Green |
| 6,076,159 | A | 6/2000 | Fleck et al. |
| 6,079,014 | A | 6/2000 | Papworth et al. |
| 6,085,315 | A | 7/2000 | Fleck et al. |
| 6,216,200 | B1 | 4/2001 | Yeager |
| 6,223,278 | B1 | 4/2001 | Morrison |
| 6,247,124 | B1 | 6/2001 | Joshi et al. |
| 6,249,862 | B1 | 6/2001 | Chinnakonda et al. |
| 6,266,755 | B1 | 7/2001 | Yeager |
| 6,286,130 | B1 * | 9/2001 | Poulsen et al. .............. 717/119 |
| 6,298,438 | B1 | 10/2001 | Thayer et al. |
| 6,308,252 | B1 | 10/2001 | Agarwal et al. |
| 6,393,550 | B1 | 5/2002 | Fetterman |
| 6,430,655 | B1 | 8/2002 | Courtright et al. |
| 6,473,837 | B1 | 10/2002 | Hughes et al. |
| 6,477,639 | B1 | 11/2002 | Krishnan et al. |
| 6,505,285 | B1 | 1/2003 | Rabinovici et al. |
| 6,546,477 | B1 | 4/2003 | Russo et al. |
| 6,557,127 | B1 | 4/2003 | Adams et al. |
| 6,594,728 | B1 | 7/2003 | Yeager |
| 6,598,148 | B1 | 7/2003 | Moore et al. |
| 6,643,767 | B1 * | 11/2003 | Sato ........................... 712/219 |
| 6,691,221 | B2 | 2/2004 | Joshi et al. |
| 6,757,817 | B1 | 6/2004 | Booth |
| 6,760,835 | B1 | 7/2004 | Yu |
| 6,836,833 | B1 | 12/2004 | Kinter et al. |
| 6,915,395 | B1 | 7/2005 | Singh |
| 7,032,226 | B1 | 4/2006 | Nemirovsky et al. |
| 7,263,599 | B2 * | 8/2007 | Norden et al. .............. 712/205 |
| 7,398,375 | B2 * | 7/2008 | Ernst et al. .................. 712/217 |
| 2004/0193858 | A1 | 9/2004 | Ahmad et al. |
| 2005/0102483 | A1 | 5/2005 | Kinter et al. |
| 2006/0095732 | A1 * | 5/2006 | Tran et al. ................... 712/217 |
| 2006/0149904 | A1 | 7/2006 | Mowry |
| 2006/0259747 | A1 * | 11/2006 | Gonzalez et al. ............ 712/226 |

FOREIGN PATENT DOCUMENTS

| | | |
|---|---|---|
| WO | WO 02/082278 A1 | 10/2002 |

OTHER PUBLICATIONS

ADSP-21535 Blackfin™ DSP Brochure, Analog Devices, Inc., 4 pages (2001).

*Andes R10000 User's Manual*, Revision 2.0, MIPS Technologies, Inc., Entire Text (Sep. 19, 1996).

Arvind, A. And Maessen, J.-W., "Memory Model = Instruction Reordering + Store Atomicity," *ACM SIGARCH Computer Architecture News*, vol. 34, Issue 2, pp. 29-40 (May 2006).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI)Systems*, vol. 8, No. 3, pp. 317-326 (Jun. 2000).

Bird, P.L. et al., "The Effectiveness of Decoupling," *Proceedings of the 7th Int'l Conference on Supercomputing*, 1993, pp. 47-56, ACM Press, New York, NY.

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev. 49*(1):167-188, International Business Machines Corporation (Jan. 2005).

Cotterell, S. And Vahid, F., "Tuning of Loop Cache Architecture to Programs in.Embedded System Design," *ISSS'02*, 6 pages (Oct. 2002).

Courtright, D., "Introducing: the MIPS32™ 4Kc™ and MIPS32™ 4Kp™ Processor Cores 'Jade'," paper copy of slide presentation distributed at the Embedded Microprocessor Forum, pp. 1-25 (May 1999).

De Vries, H., *Understanding the detailed Architecture of AMD's 64 bit Core*, 85 pages, printed Oct. 16, 2007 from http://chip-architect.com/news/2003_09_21_Detailed_Architecture_of_AMDs_64bit_Core.html (Sep. 21, 2003).

Flynn et al., "Using Simple Tools to Evaluate Complex Architectural Trade-Offs," *IEEE Micro*, pp. 67-75 (Jul.-Aug. 2000).

Fukuoka, K. et al., "Leakage Power Reduction for Clock Gating Scheme on PD-SO1," *IEEE Computer Society Int'l Symp. On Circuits and Systems*, pp. 613-616 (2004).

Goodman, J.R. et al., "PIPE: A VLSI Decoupled Architecture," *ACM SIGARCH Computer Architecture News*, Jun. 1985, pp. 20-27, ACM Press, New York, NY.

Gwennap, L., "MIPS R10000 Uses Decoupled Architecture," *Microprocessor Report*, vol. 8, No. 14, pp. 1-5 (Oct. 24, 1994).

Gwennap, L., "MIPS R12000 to Hit 300 MHz," *Microprocessor Report*, vol. 11, No. 13, pp. 1-4 (Oct. 6, 1997).

Gwennap, L., "MIPS Roadmap Focuses on Bandwidth," *Microprocessor Report*, pp. 1-3 (May 12, 1997).

Gwennap, L., "SGI Provides Overview of TFP CPU," *Microprocessor Report*, vol. 7, No. 2, pp. 1-2 (Feb. 15, 1993).

Gwennap, L., "TFP Designed for Tremendous Floating Point," *Microprocessor Report*, vol. 7, No. 11, pp. 1-5 (Aug. 23, 1993).

*Intel Architecture Software Developer's Manual*—vol. 2: Instruction Set Reference, Intel. Corporation, pp. 3-278 and 3-279 (1997).

*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kiyohara, T. et al., "Register Connection: A New Approach to Adding Registers into Instruction Set Architectures," *Int'l Conf. on Computer Architecture.—Proc. of the 20th Annual Int'l. Symp. on Computer Architecture*, San Diego, CA, pp. 247-256 (1993).

Krewell, K., "Intel Looks To Core For Success", Microprocessor Report, vol. 20, Mar. 2006, pp. 1, 4, 5 and 6.

Lee, L.H. et al., "Instruction Fetch Energy Reduction Using Loop Caches For Embedded Applications with Small Tight Loops," *ISLPED'99*, pp. 267-269 (1999).

Lipasti, M. et al., "Physical Register Inlining," at <http://www.ece.wisc.edu/~pharm/papers/isca2004_egunadi.pdf>, 11 pages (retrieved Jun. 12, 2006).

Merten, M.C. et al., "Modulo Schedule Buffers", IEEE, pp. 138-149 (Dec. 2001).

*MIPS R10000 Microprocessor User's Manual, Version 2.0*, MIPS Technologies, Inc., 424 pages (Jan. 29, 1997).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Nemirovsky, M. et al., U.S. Appl. No. 09/602,279, filed Jun. 23, 2000, entitled "Methods and Apparatus for Background Memory Management".

Osborne, M. et al., "Superscalar Pipeline Architectures," Slide Presentation, 36 pages, downloaded Jun. 19, 2007 from http://www.academic.marist.edu/~jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Peng, M. and Azgomi, S., "Content-Addressable memory (CAM) and its network applications," at http://www.eetasia.com/ARTICLES/2000MAY/2000MAY03_MEM_NTEK_TAC.PDF, 3 pages (retrieved Jun. 12, 2006).

Pierce, J. and Mudge, T., "Wrong-Path Instruction Prefetching," *IEEE Computer Society 29th Int'l. Symp. on Microarchitecture*, pp. 165-175 (1996).

Price, C., *MIPS R10000 MIPS IV ISA Manual: Andes*, Revision 3.2, MIPS Technologies, Inc., 323 pages (Sep. 1995).

Rhodes, S., *MIPS R8000 Microprocessor Chip Set User's Manual*, Revision 3.0, Silicon Graphics, Inc., 352 pages (Jul. 1994).

Schmidt, D.C., "Transparently Parameterizing Synchronization into a Concurrent Distributed Application: A Case Study of C++Design Evolution," *C++Report*, SIGS Publications, vol. 6, No. 3, 10 pages (Jul.-Aug. 1994).

Smith, J.E. et al., "The ZS-1 Central Processor," *Proceedings of the Second Int'l Conference on Architectural Support for Programming Languages and Operating Systems*, 1987, pp. 199-204, IEEE Computer Society Press, Los Alamitos, CA.

Smith, J.E., "Retrospective: Decoupled Access/Execute Computer Architectures," *25 Years of the international Symposia on Computer Architecture (Selected Papers)*, Jun. 1998, pp. 27-28, ACM Press, New York, NY.

Solomon, B. et al., "Micro-Operation Cache: A Power Aware Frontend for Variable Instruction Length ISA," *Symp. on Low Power Electronics and Design*, pp. 4-9 (Aug. 2001).

*SPARC64 V Processor For UNIX Server*, Revision 1.0, Fujitsu Limited, 24 pages (Aug. 2004).

Sung, M. et at., "Multithreading Decoupled Architectures for Complexity-Effective General Purpose Computing," *ACM SIGARCH Computer Architecture News* vol. 29—Issue 5, Dec. 2001, pp. 56-61, ACM Press, New York, NY.

Taylor, M., *The Raw Prototype Design Document*, Dept. of Electrical Engineering and Computer Science—Massachusetts Institute of Technology, pp. 1, 5, 6, 10, and 53 (Nov. 1999).

$V_R$Series™ *User's Manual: $V_R$10000™ Microprocessor, Version 1.0*, NEC, Entire Text (Nov. 1995).

Watts, C. et al., "ARM Intelligent Energy Manager Future Evolution," paper copy of slide presentation distributed at the ARM Developers' Conference '04, 34 sheets (Oct. 2004).

Yeager, K.C., "The MIPS R10000 Superscalar Microprocessor," *IEEE Micro*, pp. 28-40 (1996).

International Search Report and Written Opinion, dated Aug. 6, 2007, for PCT Appl. No. PCT/US2007/003752, 9 pages.

*Intel Architecture Software Developer's Manual*, vol. 1-3, pp. 2-7, 2-10, 2-11, 2-12, 3-329, 9-16, A-10, and A-20 (1999).

* cited by examiner

SYSTEM AND METHOD FOR PROPAGATING OPERAND AVAILABILITY PREDICTION BITS WITH INSTRUCTIONS THROUGH A PIPELINE IN AN OUT-OF-ORDER PROCESSOR

FIELD OF THE INVENTION

The present invention relates generally to microprocessors. More particularly, it relates to an out-of-order processor.

BACKGROUND OF THE INVENTION

Many microprocessors are relatively simple in-order machines. In an in-order processor instructions are fetched and if source operands of the instruction are available in a register file of the processor the instruction is issued to the appropriate functional unit. Instruction issue typically refers to sending an instruction to a functional unit, for example an execution unit, for processing. In an in-order processor, instructions are issued and executed in program order. In a pipelined in-order processor the pipeline is stalled until operands of an instruction are available.

In an out-of-order processor, instructions are fetched and dispatched to an instruction dispatch buffer. The instructions wait in the buffer until their operands are ready and are issued before earlier or older instructions, and out of program order. The results are then queued in a buffer, for example in a completion buffer. The completion buffer keeps track of the program order of instructions and after older instructions write their result into the register file, the younger instructions write their results into the register file. In an out-of-order processor, instructions are executed out of program order and their results are written into the register file in program order. Pipelined out-of-order processors allow execution of instructions to be scheduled around hazards that would stall a pipelined in-order processor.

Typically, instructions comprise one or more source operands and a destination operand. The destination operand of an instruction is usually modified based on, at least in part, the source operands. An instruction that modifies a destination operand is typically referred to as a producer of another instruction whose source operand it modifies. The instruction whose source operand is modified by a producer instruction is typically referred to as a consumer. The source operand of the consumer is typically the destination operand of the producer. Producers are processed by an execution unit of a processor before their corresponding consumers are processed. Producer instructions may be consumers of other producers and consumers may be producers of other consumer instructions. A consumer may have more than one producer that it depends upon for source operands. The source operands of a consumer instruction may be bypassed from a producer instruction.

Bypassing refers to the transfer of an operand value modified by a producer instruction to a consumer instruction before the producer instruction writes its results into a register file (i.e. before the producer updates the architectural state). A bypass policy of a processor determines when and from where one or more operand values modified by a producer instruction can be sent to a consumer instruction. An instruction can only be issued to an execution unit of a processor when all source operand values are available (e.g. in a register file or via bypass from a producer instruction). As a result, the bypass policy can determine the earliest time that an instruction can be issued.

Some out-of-order processors use a technique known as scoreboarding to allow instructions to execute out-of-order when there are sufficient computing resources available and no data dependencies for the source operands. A centralized scoreboard is used to check for operand availability of an instruction. A centralized scoreboard stores the status for each register in a processor and every instruction looks up the centralized scoreboard to determine if their operands are available. In an out-of-order processor that uses scoreboarding, every instruction goes through the centralized scoreboard where a record of data dependencies of the source operands of the instruction is created. The centralized scoreboard determines when the instruction can read its operands and begin execution. If the centralized scoreboard decides that an instruction cannot execute immediately due to unavailability of its source operands, it monitors changes in the system state and decides when the operands are ready. If the source operand values are ready to be read, the centralized scoreboard determines when the instruction can be issued. Thus all hazard detection and resolution is centralized in the scoreboard. The centralized scoreboard has to communicate with all functional units of the processor which represents a structural hazard since there are only a limited number of buses on which to communicate.

A centralized scoreboard implementation requires a large area on the chip. Furthermore, looking up a centralized scoreboard can be time consuming. A centralized scoreboard stores the status for each register. An instruction typically needs to access values for one or two operands and looks up the status for one or two registers. When a centralized scoreboard is accessed to determine availability of operands, one or two registers in the scoreboard are selected out of all the registers in the processor. This is equivalent to a time consuming lookup of a register file. Also, complicated routing is required if multiple instructions attempt to lookup a scoreboard at the same time. The size of the scoreboard and the number of buses to the scoreboard can be increased which consumes valuable chip real estate and also has timing implications. The complexity of looking up a centralized scoreboard also delays instruction issue.

What is needed is a new technique for reducing the complexity of a centralized scoreboard in an out-of-order microprocessor, which overcomes the deficiencies noted above.

BRIEF SUMMARY OF THE INVENTION

The present invention provides a processor core and a method for distributive scoreboard scheduling in an out-of-order processor. In an embodiment, control logic appends operand availability bits to each instruction. The appended operand availability bits form a distributive scoreboard for each instruction. The appended operand availability bits are propagated together with the instruction through multiple stages of a processor pipeline. An instruction dispatch buffer stores the instruction and the operand availability bits. A dispatch controller determines when an instruction is to be issued. The determination is based, at least in part, on the operand availability bits stored in the instruction dispatch buffer.

In an embodiment, the operand availability bits of an instruction include a counter value that is used to determine when an operand modified by a producer instruction can be bypassed to the consumer instruction. The operand availability bits include a bit to activate counters of consumer instructions when producer instructions are issued into an execution unit of the processor. Producer instructions are appended with a wakeup enable value that is used to activate the counters of consumer instructions when producer instructions are issued into the execution unit of the processor. When a producer instruction is issued into an execution unit of the processor, the counter of a consumer instruction starts to decrement. When the counter counts down to zero, the operand being modified by the producer instruction can be bypassed to the consumer instruction. Thus, the consumer instruction does not have to wait for the producer instruction to write the modified operand into a register file of the processor before it can be accessed. This speeds up instruction issue and thereby increases instruction throughput. In an embodiment, using a wakeup enable value, a producer instruction can delay the start of a counter thereby controlling when a consumer instruction is issued.

The operand availability bits include a value to indicate whether an operand is present in the register file of the processor. The operand availability bits also include a value to indicate whether an operand is predictably available in the processor.

In an embodiment of the present invention, a modified renaming map also stores operand availability bits.

In one embodiment of the present invention, the processor core includes a pipeline that includes multiple parallel processing paths where instructions in each parallel processing path include appended operand availability bits.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification illustrate the present invention and together with the description further serve to explain the principles of the invention and to enable a person skilled in the pertinent art to make and use the invention. In the drawings, like reference numbers indicate identical or functionally similar elements. Additionally, the left-most digit of the reference number indicates a drawing in which the reference number first appears.

DETAILED DESCRIPTION OF THE INVENTION

The present invention provides a processor core and a method for implementing distributive scoreboard scheduling in an out-of-order processor. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Although embodiments are described with reference to pipelined out-of-order processors, it is within the knowledge of one skilled in the art to implement embodiments in a non-pipelined processor or a partially pipelined processor.

Figure 1:
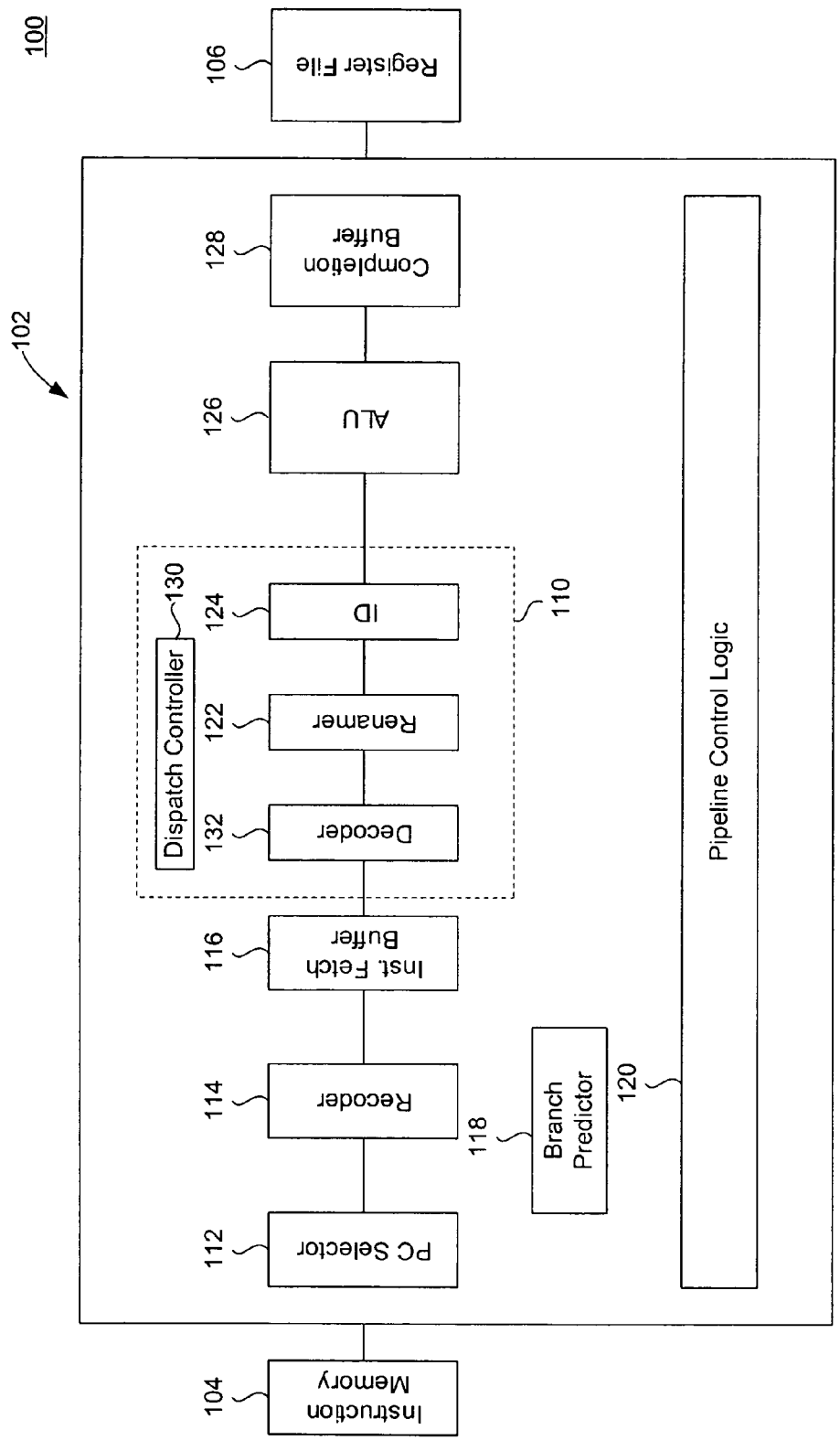
FIG. 1 is a diagram of a processor core according to a first embodiment of the present invention.

FIG. 1 is a diagram of a processor 100 according to an embodiment of the present invention. Processor 100 includes a processor core 102, instruction memory 104, and a register file 106. Processor core 102 has a pipeline that includes an instruction dispatch unit 110.

As shown in FIG. 1, instruction dispatch unit 110 of processor core 102 includes a dispatch controller 130, decoder 132, renamer 122 and instruction dispatcher (ID) 124. According to an embodiment, renamer 122 includes control logic (not shown) that appends operand availability bits to an instruction fetched from instruction fetch buffer 116 and decoded by decoder 132. In an embodiment, processor core 102 may include multiple pipeline stages. The operand availability bits appended to an instruction by renamer 122 may be propagated together with the instruction through multiple pipeline stages. Instruction dispatcher 124 includes an instruction dispatch buffer (IDB) 700 (not shown here but described below) that stores the instruction and most of the appended operand availability bits. Dispatch controller 130 dynamically schedules instructions for execution by ALU 126 based on the appended operand availability bits stored in instruction dispatch buffer 700.

In an embodiment, the operand availability bits of a consumer instruction include a counter value that is used to determine when an operand modified by a producer instruction can be bypassed to the consumer instruction. The operand availability bits include a bit to activate counters of consumer instructions when producer instructions are issued into ALU 126 of processor 100. Producer instructions are appended with a wakeup enable value that is used to activate the counters of consumer instructions when producer instructions are issued into ALU 126. When a producer instruction is issued into ALU 126, the counter starts to decrement. When the counter counts down to zero, the consumer instruction can be issued so that it can receive bypassed operands from producer instructions. Thus, the consumer instruction does not have to wait for the producer instruction to write the modified operand into register file 106 before it can be accessed. The use of a counter to determine if one or more operand(s) of an instruction may be accessed before they are written to register file 106 results in faster instruction issue and increased instruction throughput.

In an embodiment, using a wakeup enable value, a producer instruction can delay the start of a counter thereby controlling when a consumer instruction is issued.

In an embodiment, operand availability bits include a value to indicate whether an operand is present in the register file of the processor. The operand availability bits also include a value to indicate whether an operand is predictably available in processor 100. For example, if a load instruction has a cache miss, it has to access the data from main memory or hard disk. Data access times from main memory or hard disk are unpredictable. Once the data is accessed from main memory or hard disk and is available in one of the functional units of processor 100, it is predictably available. Upon a load miss this bit is set to 0 and when the value to be loaded is predictably available in processor 100, it is set to 1.

Use of a distributive scoreboard, in the form of operand availability bits appended to an instruction, eliminates the need to continually access a centralized scoreboard to determine if an instruction can be issued, as is done in conventional out-of-order processors.

Processor core 102 also includes a program counter (PC) selector 112, an optional recoder 114, a branch predictor 118 and pipeline control logic 120.

Program counter selector 112 selects an address or program counter value to be used to fetch a program instruction from memory. In one embodiment, PC selector 112 can select a sequentially incremented program counter value, a redirect program counter value, or a program counter value for a new program thread.

Processor core 102 is preferably capable of executing both a standard width instruction (e.g., a 32-bit instruction) and a compressed-format width instruction (e.g., a 16-bit instruction). Accordingly, in one embodiment, processor core 102 includes optional recoder 114. If a compressed-format instruction is fetched from instruction memory 104, it is recoded by recoder 114 to a format width that can be decoded by decoder 132 and executed by arithmetic logic unit 126. In one embodiment, both standard width instructions and compressed-format width instructions are recoded by recoder 114 to an instruction width having more bits than a standard width instruction. Instructions are passed from optional recoder 114 to instruction buffer 116.

Instruction buffer 116 is capable of holding multiple instructions. In one embodiment, in which processor core 102 implements multithreading, instructions from different program threads are stored, for example, in separate portions of instruction buffer 116. Multithreading refers to an ability of an operating system to execute different parts of a program, called threads, simultaneously. In another embodiment, in which processor core 102 implements multithreading, instructions from different program threads are stored in separate instruction buffers, for example, one instruction buffer for each program thread. Processor core 102 preferably fetches multiple instructions per fetch cycle.

In instances where a control transfer instruction, for example a branch instruction or a jump instruction, is fetched from instruction memory 104, branch predictor 118 predicts whether a conditional branch associated with the control transfer instruction is taken or not taken. Any known branch prediction algorithm can be used.

Instructions are read from instruction buffer 116 and decoded by decoder 132. Decoder 132 performs the functions of decoding instructions. Renamer 122 performs the functions of updating register renaming map 600 (not shown here but described below). During the decoding and renaming process, each instruction is associated with/assigned an instruction identification (IID) tag. An IID is a unique identifier assigned to each instruction. Source and destination operands of an instruction are each assigned a completion buffer identification (CBID) tag. The CBID for a destination operand determines the location in completion buffer 128 where arithmetic logic unit 126 can write calculated results for an instruction. The CBID for source operands are the locations in completion buffer 128 where source operand values can be located. In one embodiment, the instruction identification tags are sequentially generated multi-bit values. The number of bits that are generated is dependent on how many instructions are executed simultaneously. In one embodiment, in which processor core 102 performs multi-threading, instruction identification tags are generated and assigned on a per thread basis.

Instructions are read from instruction dispatcher 124 and executed by arithmetic logic unit (ALU) 126 in accordance with a schedule determined by dispatch controller 130. Dispatch controller 130 schedules instructions for execution once their operands are ready and preferably in accordance with their age. Age of an instruction is determined by the program. For example, an earlier instruction in program order is "older" than a later instruction in program order. In out-of-order processor 100, if operands for both an older instruction and a younger instruction are available, then the older instruction is preferably issued before younger instruction. In an embodiment, instruction dispatch buffer 124 is stores instructions in the order that it receives instructions. Instructions at the top of the queue in instruction dispatch buffer 124 are older instructions. The older instructions that have available operands are dispatched by instruction dispatcher 124 before instructions lower in the instruction dispatch buffer 124 queue. In an embodiment, dispatch controller 130 may be part of ID 124 or pipeline control logic 120.

Results in arithmetic logic unit 126 are written to completion buffer 128 and stored until instructions graduate and their results are written to register file 106.

Instruction memory 104 is any memory accessible to processor core 102, for example, an instruction cache, a scratch pad, a loop buffer, et cetera. In one embodiment, memory 104 includes multiple memories and/or multiple types of memories.

Register file 106 includes a plurality of general purpose registers (not shown), which are visible to a programmer.

Figure 2:
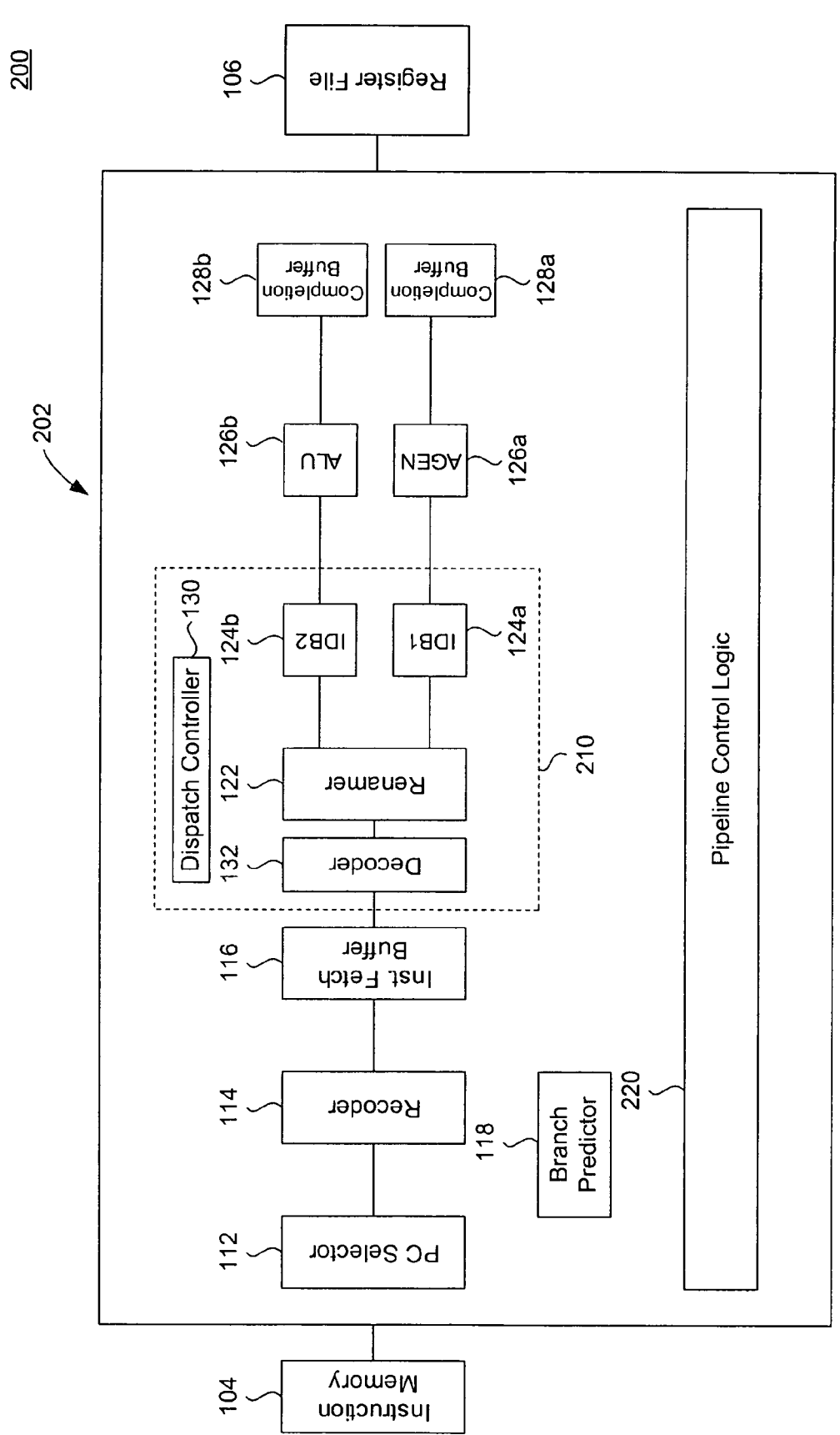
FIG. 2 is a diagram of a processor core according to a second embodiment of the present invention.

FIG. 2 is a diagram of a processor 200 according to another embodiment of the present invention. Processor 200 includes a processor core 202, instruction memory 104, and a register file 106. Processor core 202 has a pipeline that includes instruction dispatch unit 210.

As shown in FIG. 2, instruction dispatch unit 210 of processor core 202 includes a dispatch controller 130, decoder 132, renamer 122. In the embodiment shown in FIG. 2 there are two pipelines, one for ALU 126b and one for Address Generation (AGEN) 126a. Microprocessor 200 operates similarly to microprocessor 100 except that microprocessor 200 includes two parallel instruction execution pipelines. These two instruction execution pipelines can be similar, or they can be specialized to execute selected instructions. In one embodiment, the pipeline represented by instruction dispatcher 124a, AGEN 126a, and completion buffer 128a is used to execute control transfer instructions such as branch, jump and return instructions as well as load, store, prefetch, cache instructions. The pipeline represented by instruction dispatcher 124b, ALU 126b and completion buffer 128b is used to execute arithmetic instructions such as add, subtract etc.

Since there are two pipelines, instruction dispatch unit 210 has two instruction dispatchers i.e. instruction dispatcher 124a and instruction dispatcher 124b. According to an embodiment, renamer 122, in instruction dispatch unit 210, includes control logic (not shown) that appends operand availability bits to an instruction fetched from instruction fetch buffer 116 and decoded by decoder 132. Instruction dispatchers 124a and 124b each include an instruction dispatch buffer (not shown), similar to IDB 700, that stores the instruction and most of the appended operand availability bits. Dispatch controller 130 determines when an instruction is issued to ALU 126b or AGEN 126a based on operand availability bits appended to instructions stored in respective instruction buffer of instruction dispatchers 124a and 124b.

As shown in FIG. 2, processor core 202 includes a program counter (PC) selector 112, an optional recoder 114, an instruction buffer 116, a branch predictor 118 and pipeline control logic 220.

Processor core 202 includes two completion buffers 128a and 128b associated with each of AGEN 126a and ALU 126b. Scheduler 130 dynamically schedules instructions for execution by the two parallel pipelines of processor core 202.

In an embodiment, processor 200 may include multiple parallel pipeline stages. The operand availability bits appended to an instruction by renamer 122 may be propagated together with the instruction through multiple parallel pipeline stages. The operand availability bits may be modified to accommodate parallel pipeline stages. As will be understood by persons skilled in the relevant arts given the description herein, operand availability bits may be modified for parallel pipeline stages. It is also to be appreciated that although the examples presented herein use single pipelines, alternate embodiments are not limited to single pipelines. For example, in a processor that includes more than two pipelines, more than two instruction dispatchers and associated functional units may be used. In another example, a single instruction dispatcher may be used for multiple pipelines. As will be understood by persons skilled in the relevant arts given the description herein, the number of functional units in may vary depending on implementation.

Figure 3:
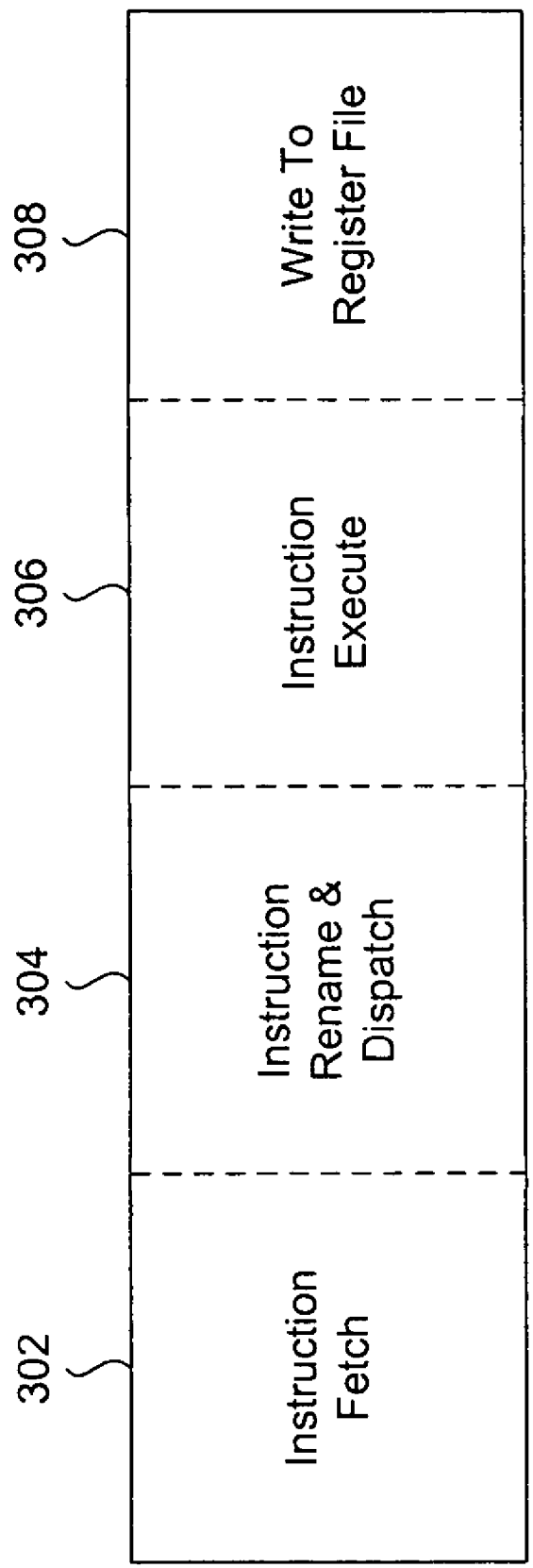
FIG. 3 is a diagram of pipeline stages of a processor.

FIG. 3 is a diagram illustrating example pipeline stage partitions of a processor e.g. processor 100 or processor 200. In the embodiment shown in FIG. 3, processor 100 is partitioned into four pipeline stages. These four pipeline stages are illustrative and not intended to limit the present invention. In other embodiments, processor 100 can have more or less than four pipeline stages. The number of pipeline stages that are implemented in any embodiment of the present invention is a design choice.

As shown in FIG. 3, the four pipeline stages of processor 100 are instruction fetch stage 302, instruction rename and dispatch stage 304, instruction execute stage 306 and write to register file stage 308.

Stage 302 typically includes PC selector 112, recoder 114 and instruction fetch buffer 116. In stage 302, PC selector 112 selects amongst a variety of program counter values to be used to fetch an instruction from instruction memory 104. Instruction tags associated with an instruction to be fetched from instruction memory 104 are checked. One or more instructions are fetched from instruction memory 104. Compressed-format instructions are recoded by recoder 114 into a format that can be decoded and executed. All instructions are written to instruction buffer 116. In one multithreading embodiment, processor 100 includes one instruction buffer for each program thread. In one embodiment, instructions can be dispatched directly to decoder 132.

Stage 304 typically includes decoder 132, renamer 122, instruction dispatcher 124 and dispatch controller 130. Renamer 122 includes renaming map 600 and renaming control logic (not shown). Instruction dispatcher 124 includes an instruction dispatch buffer (IDB) 700 and instruction dispatch control logic (not shown). In an example, for a parallel pipeline, as in processor 200, stage 304 includes instruction dispatchers 124a and 124b. In stage 304, instructions are decoded, renamed and dispatched. In parallel with decoding using decoder 132, renamer 122 updates register renaming map 600. A register renaming map is a structure that holds the mapping information between programmer visible architectural registers and internal physical registers. According to an embodiment, renaming map 600 is modified to include availability bits for each register in processor 100. Renaming map 600 also has CBIDs corresponding to the latest provider for each register in processor 100. For each instruction, renamer 122 appends operand availability bits to the instruction. The instruction can then take the availability bits from renaming map 600 through the pipeline, thereby creating a distributive scoreboard that determines when operands are available. Use of renaming map 600 to obtain operand availability bits obviates the need for a centralized scoreboard and the need for an instruction to lookup a centralized scoreboard repeatedly to determine when operands are available.

According to an embodiment, renamer 122, in instruction dispatch unit 110, includes renaming control logic (not shown) that appends operand availability bits to an instruction fetched from instruction fetch buffer 116 and decoded by decoder 132. Instruction dispatcher 124 includes an instruction dispatch buffer 700 that stores the instruction and most of the appended operand availability bits. Dispatch controller 130 determines when the instruction is issued to ALU 126 of processor core 102 based on the operand availability bits stored in the IDB 700 of instruction dispatcher 124. In one embodiment, in which processor 100 includes accumulation registers (not shown), digital signal processor (DSP) registers (not shown) and co-processor registers (not shown), a separate renaming map is maintained for the different register types. These renaming maps are similar to the renaming map 600 maintained for general purpose registers. In another embodiment, renaming map 600 may be used for all registers.

As noted herein, register renaming is done for destination registers to remove output dependencies and to ensure there is a single producer of a given register in processor core 102 at any given time. The source registers are renamed so that data is obtained from a producer at the earliest opportunity instead of waiting for the processor's state to be updated. This also aids in reducing dependency check complexity in any coprocessor coupled, for example, to arithmetic logic unit 126.

Instructions in stage 304 receive an instruction identification (IID) tag and a completion buffer identification (CBID) tag. The destination operand of an instruction has the same CBID as that assigned to its instruction. The CBID for a destination operand determines the location in completion buffer 128 where arithmetic logic unit 126 can write calculated results for an instruction. The source operands of an instruction are assigned the CBIDs of their corresponding producer instructions. The source operands lookup CBIDs of their corresponding producer instructions in renaming map 600. In one embodiment, each instruction identification tag is a thread-specific sequentially generated value that uniquely determines the program order of instructions. At the end of stage 304, decoded and renamed instructions are placed in instruction dispatch buffer 700 of instruction dispatcher 124. Dispatch controller 130 selects instructions residing in instruction buffer for execution by arithmetic logic unit 126.

Stage 306 typically comprises ALU 126. In another example, stage 306 may have parallel pipeline stages such as AGEN 126a. In stage 306, instructions are executed by arithmetic logic unit 126 and control transfer instructions such as, for example, branch instructions and jump instructions are resolved. In one embodiment, selected instructions such as, for example, floating point instructions are processed by a coprocessor (not shown) coupled to arithmetic logic unit 126.

In stage 308, results generated by ALU 126 and/or a coprocessor are written to completion buffer 128. As noted above, an instruction's destination operand is assigned a CBID number in stage 304. As instructions complete execution, their corresponding completion buffer completion bits are set, thereby enabling the instructions to graduate and release their associated CBID numbers. Results from completion buffer 128 are written to register file 106 as instructions graduate and register renaming map(s) are updated. Each instruction preferably graduates according to program order.

Figure 4:
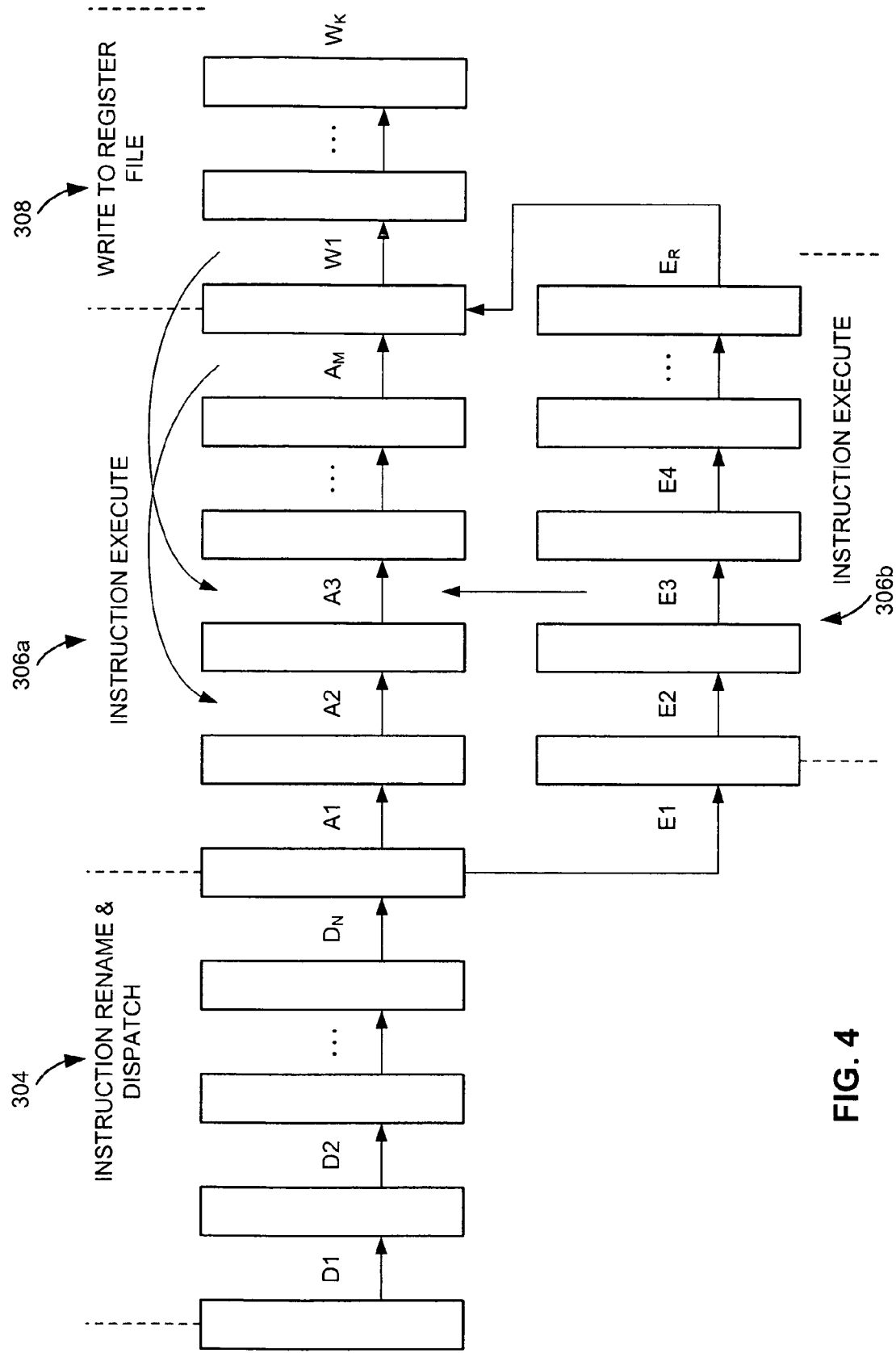
FIG. 4 is a more detailed diagram of pipeline stages of a processor.

FIG. 4 is a diagram illustrating further pipeline stage partitions of some of the pipeline stages in FIG. 3. In the embodiment shown in FIG. 4, instruction decode stage is divided into N stages D1 to $D_N$. Instruction execute stage 306 is divided into parallel stages 306a and 306b. Stage 306a may include AGEN 126a and stage 306a may include ALU 126b. Instruction execute stage 306a is divided into M stages A1 to $A_M$ and instruction execute stage 306b is divided into R stages E1 to $E_R$. Write back stage 308 is divided into K stages W1 to $W_K$. These pipeline stages are illustrative and not intended to limit the present invention. In other embodiments, processor core 102 can have more or less pipeline stages. The number of pipeline stages that are implemented in any embodiment of the present invention is a design choice. The pipeline stages shown in FIG. 4 illustrate bypassing of operands between producer instructions and consumer instructions.

Typically, instructions comprise one or more source operands and a destination operand. The destination operand of an instruction is usually modified based on, at least in part, the source operands. An instruction that modifies a destination operand is typically referred to as a producer of another instruction whose source operand it modifies. The instruction whose source operand is modified by a producer instruction is typically referred to as a consumer. The source operand of the consumer is typically the destination operand of the producer. Producers are processed by an execution unit of a processor before their corresponding consumers are processed. Producer instructions may be consumers of other producers and consumers may be producers of other consumer instructions. A consumer may have more than one producer that it depends upon for source operands. The source operands of a consumer instruction may be bypassed from a producer instruction.

Bypassing refers to the transfer of an operand value modified by a producer instruction to a consumer instruction before the producer instruction writes its results into a register file (i.e. before the producer updates the architectural state). A bypass policy of a processor determines when and from where one or more operand values modified by a producer instruction can be sent to a consumer instruction. An instruction can only be issued to an execution unit of a processor when all source operand values are available. As a result, the bypass policy can determine the earliest time that an instruction can be issued.

Typically, a consumer instruction is issued when its operands are available in register file 106. By passing a consumer instruction's source operand values, a consumer instruction can issue before its operand values are available in register file 106. When a consumer instruction can be issued is determined by when its producer instruction is issued and from where in a processor the operands can be bypassed to a consumer. The minimum number of pipeline stages (i.e. pipeline stage difference) between a producer and a consumer, when a bypass of an operand value from the producer instruction to the consumer instruction can occur is used as an initial counter value. This counter value is stored in renaming map 700 by renamer 122 upon renaming a producer instruction. In an embodiment, the counter value may be the minimum number of clock cycles after issue of a producer instruction when a bypass from a producer to a consumer can occur. The counter value is propagated with a consumer instruction through multiple pipeline stages. In an embodiment, the counter value is propagated only through the rename and dispatch stage 304. In this embodiment, execution stage 306 need not be pipelined since operand availability bits are propagated only till rename and dispatch stage 304. The use of a counter value makes it possible for a consumer instruction to determine whether its operand is available without having to repeatedly look up a centralized scoreboard. The use of a counter value also eliminates the need to wait for an operand of a consumer instruction to be available in register file 106 before it can be issued to instruction execute stage 306. Issuing the consumer instruction before operands are available in register file 106 increases instruction throughput.

In the example shown in FIG. 4, operand values may be bypassed from W1 stage to A3 stage. The number of stages between W1 and A3 may be 3 stages. In another example, operands may be bypassed from Am stage to A2 stage. The number of stages between Am and A2 may be 2 stages. Operands may also be bypassed from one of the pipeline stages that are in parallel with pipeline stages A1 to Am. For example, operands may be bypassed from stage 306b that is parallel with stage 306a. Operands may be bypassed from pipeline stage E3 to pipeline stage A3. The number of stages between E3 and A3 may be 0.

For a single operand that is to be modified by a producer instruction, multiple counter values may be stored in renaming map 600 by renamer 124 since the type of consumer instructions and bypass stage is unknown when the producer is processed by renamer 124. For example, a producer load instruction may bypass a value from stage E3 to a consumer add instruction in stage A2. In this case the count value is 2 because the difference between stage E3 and stage A2 is 2. If the same producer load instruction were to bypass an operand value from stage E4 to a consumer instruction in stage E1, then the counter value is 3 because the distance between stages E4 and E1 is 3 clock cycles. The stage from which a producer can bypass is implementation dependent. The type of producer instruction determines the pipeline stage from which it can bypass and the type of consumer instruction determines the pipeline stage in which it can receive a bypassed value. The producer instruction type is known upon renaming, however the consumer instruction type is not know since it is yet to be renamed. In an embodiment, depending upon type of producer instruction, two counter values are stored in renaming map 600. When a consumer instruction is renamed, its type is known and one of the two counter values is selected. In another embodiment, the type of consumer instruction may be irrelevant and the counter value is based solely on the type of producer instruction and where it can bypass a value from. In an embodiment, to limit the size of the counter that decrements a counter value, the counter values limited to two bits. A wakeup enable bit (described below) may be used by a producer instruction to delay the start of a counter thereby increasing the counter value indirectly. Table 1, below shows example counter values based on the stages that an operand is bypassed from and the stages that an operand is bypassed to. Table 1 may be stored in renamer 122.

TABLE 1

|  |  | Bypass From Stage | | |
|---|---|---|---|---|
|  |  | A5 | W1 | E6 |
| Bypass to Stage | A3 | 2 | 3 | 3 |
|  | E3 | 2 | 3 | 3 |
|  | E2 | 3 | 4 | 4 |

From table 1, the counter value is 3 to bypass an operand from stage W1 to A3, is 3 to bypass from W1 to E3 and is 4 to bypass from W1 to E2. Thus the two counter values, for a producer instruction that can bypass an operand value from stage W1, are 3 and 4. Depending upon implementation, a producer instruction may be able to bypass only after reaching a certain pipeline stage. After reaching that stage the producer may be able to bypass from any stage thereafter, depending upon implementation. In one embodiment, counter values are based upon the earliest stage that a producer instruction can bypass operand values from. In another embodiment, counter values are based on stages later than the earliest stage that a producer instruction can bypass operand values from. The values shown in table 1 are for example purposes and do not limit the embodiments presented herein.

When a producer instruction is issued to instruction execute stage 306 by instruction dispatcher 124, the counter associated with an operand of a corresponding consumer instruction is activated. When the counter counts down to 0, and all other operands of a consumer instruction can be accessed or can be bypassed, the consumer instruction is ready for issue. For example, if a producer instruction can bypass an operand from stage Am to a consumer instruction in stage A2, and the difference between the pipeline stages Am and A2 is 2 stages, then the counter value for corresponding operand of the consumer instruction is 2. When the producer is issued in stage $D_N$, the counter for the consumer is activated and starts to decrement. When the producer reaches stage A2, the counter for the operand of the consumer is 0. If other operands for the consumer instruction are also predictably available, then the consumer instruction is issued. When the consumer instruction reaches stage A2, the producer instruction is in stage $A_M$ and the producer instruction bypasses the operand value to the consumer instruction in stage A2. As will be understood by persons skilled in the relevant arts given the description herein, the stages that an operand value may be bypassed from, the stages that an operand value may be bypassed to and the minimum pipeline stage difference between producer and consumer when bypass can occur may vary depending on implementation. The counter value, other operand availability bits and associated control logic are described in detail below.

Figure 5:
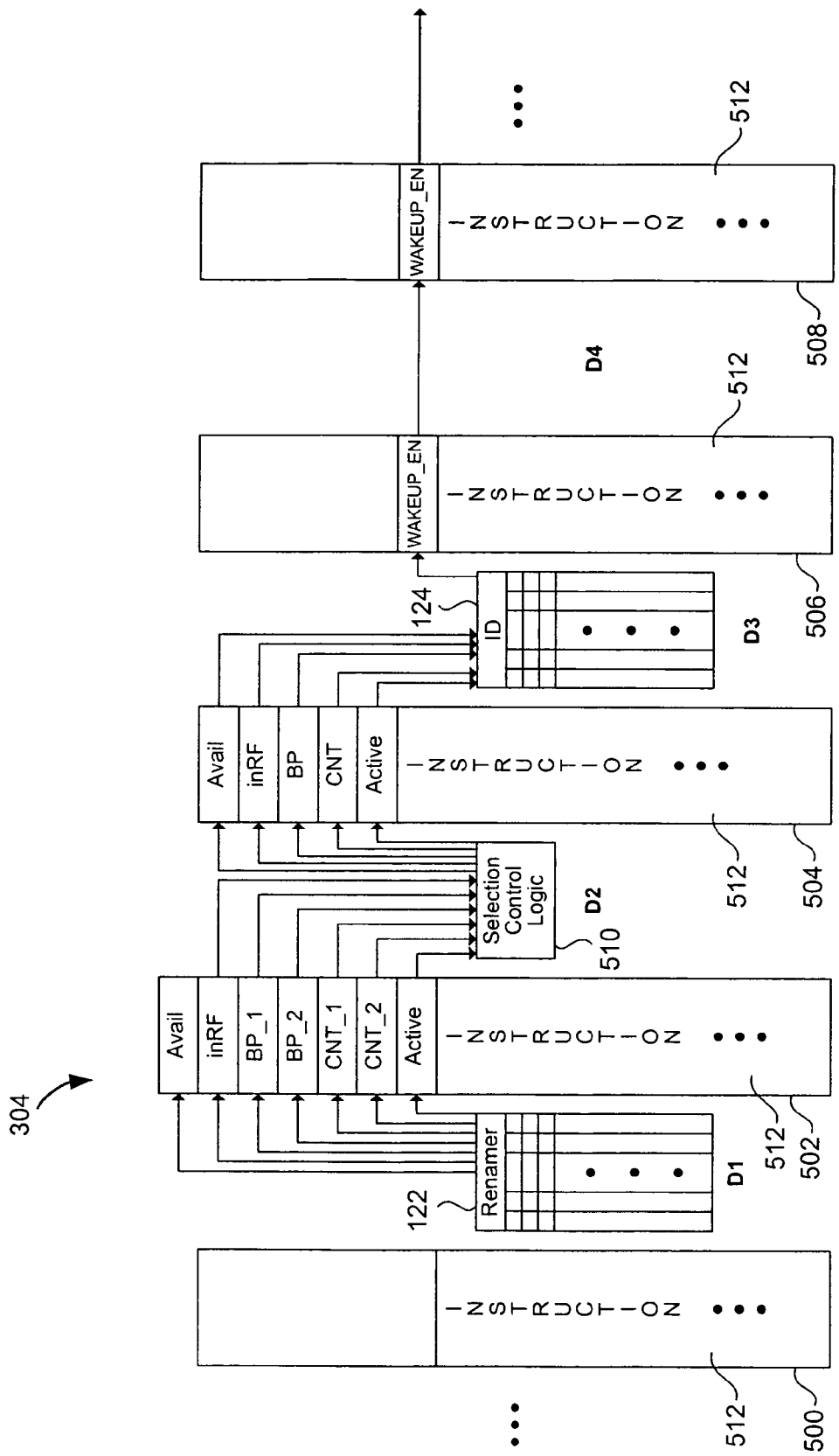
FIG. 5 is a diagram of pipeline stages of a rename and dispatch stage of a processor according to an embodiment of the present invention.

FIG. 5 is a diagram illustrating instruction rename and dispatch stage 304 according to an embodiment of the invention. For purposes of simplifying the explanation, all functional units of stage 304 are not shown in FIG. 5. In the present embodiment, stage 304 has been partitioned into four pipeline stages D1 to D4 including pipeline registers 500-508. Stage D1 includes renamer 122, stage D2 includes selection control logic 510 and stage D3 includes instruction dispatcher 124. In an embodiment, selection control logic 510 may be part of dispatch controller 130, pipeline control logic 120 or other control logic in processor 100.

Pipeline register 500 receives and stores an instruction 512 from instruction fetch buffer 116 in instruction fetch stage 302. Renamer 122 appends operand availability bits to instruction 512. In an embodiment, operand availability bits include a predictable availability (avail) bit, an in Register File (inRF) bit, a first counter value (CNT_1), a second counter value (CNT_2), a first bypass enable bit (BP_1) and a second bypass enable bit (BP_2) and an active bit for each operand of instruction 512. Instruction 512 and the appended operand availability bits are passed onto register 502.

The avail bit indicates whether an operand value is predictably available in processor 100, i.e., whether an operand value can be immediately accessed in one of the functional units of processor 100. By default, the avail bit is typically set to 1 by renamer 122 upon renaming an instruction 512. In an embodiment, the avail bit is set to 0 if the producer is a load instruction that has a cache miss and must retrieve data from main memory or hard disk. Since the number of clock cycles required to retrieve data from main memory or hard disk is unpredictable, the avail bit is set to 0 until the data can be predictably available in the processor 100. When the load instruction has a cache miss, the inRF bit may be set to 1 while the load instruction fetches data from main memory or hard disk.

The inRF bit is used to indicate availability of operand data in the register file 106. inRF is set to 0 by renamer 122 in stage D1 if operand data is not present in register file 106 and is set to 1 by renamer 122 in stage D1 if operand data is present in register file 106. In an embodiment, renamer 122 determines if the operand value for an instruction is in register file 106 when the producer for the desired operand value broadcasts the corresponding CBID upon writing to register file 106. Renamer 122 compares the source operand CBID stored in renaming map 600 with the broadcast CBID, and if CBIDs match, renamer 122 sets inRF to 1. The term "broadcast" as used herein refers to a signal or multiple signals that indicate the occurrence of an event such as, an instruction being issued into execution stage 304, an instruction writing to completion buffer 128 or an instruction writing to register file 106. In an embodiment, a broadcast is transmitted to every pipeline stage in processor 100. A broadcast typically includes information about the event such as the CBID of a register, or the IID of an instruction along with a wakeup enable value (if applicable).

BP_1 bit and BP_2 bit, corresponding to CNT_1 and CNT_2, are used to indicate whether an operand of instruction 512 will be available by pass from a producer instruction if instruction 512 is issued. Typically, BP_1 and BP_2 are set to 0 by renamer 122. BP_1 is set to 1 when CNT_1 counts down to 0 and BP_2 is set to 1 when CNT_2 counts down to 0. When the bypass enable bit (BP_1 or BP_2) for an operand of instruction 512 is set to 1, then it indicates that the operand value will be available by pass if instruction 512 is issued.

Figure 10:
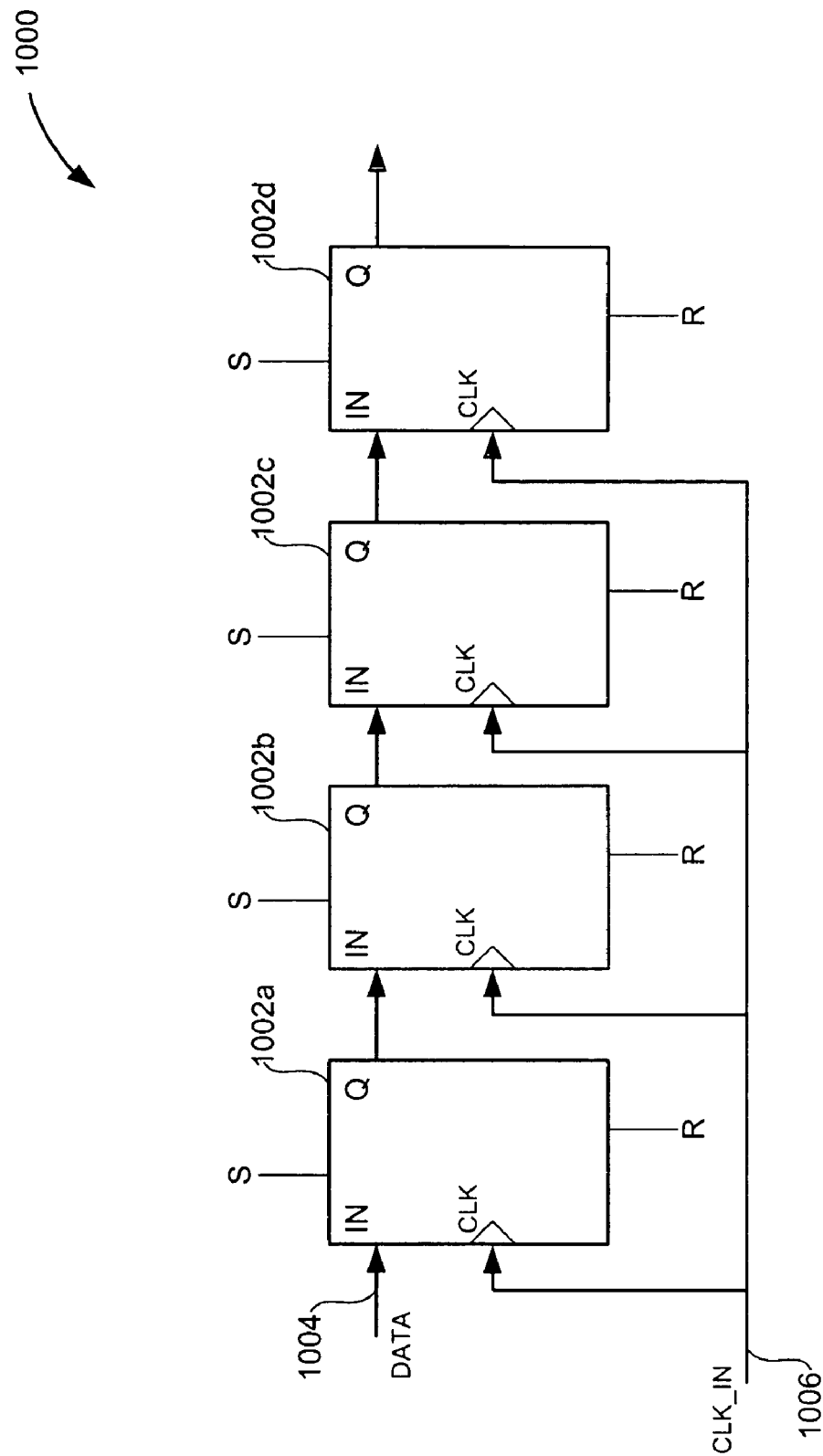
FIG. 10 is a diagram illustrating a shift-register counter according to an embodiment of the present invention.

The active bit is used to activate counters that decrement CNT_1 and CNT_2 values. Typically, active bit is set to 0 by renamer 122 upon renaming instruction 512. When a producer for instruction 512 broadcasts a CBID and a wakeup_en bit upon being issued into instruction execution stage 306, renamer 122 compares the broadcast CBID to those stored in its renaming map 600 and sets the active bit if there is a CBID match. When the active bit is set, the corresponding CNT_1 and CNT_2 values start to decrement. An example shift-register counter is illustrated in FIG. 10 and is described below.

CNT_1 and CNT_2 are counter values determined by renamer 122 based on the pipeline stage difference between producer and consumer when bypass can occur. The type of producer instruction determines the pipeline stage from which it can bypass and the type of consumer instruction determines the pipeline stage in which it can receive a bypassed value. Since the type of consumer instruction is not known, when renamer 122 renames a producer instruction, two counters CNT_1 and CNT_2 are stored in renaming map 600. When a consumer instruction is renamed by renamer 122, the consumer instruction's type is known and only one of the counter values (CNT_1 or CNT_2) may be selected. Timing constraints may prevent renamer 122 from selecting a counter value to append to an instruction. In this case, as shown in FIG. 5, both counter values CNT_1 and CNT_2 and bypass enable bits BP_1 and BP_2 are appended to an instruction. One of the two counter values (CNT_1 or CNT_2) and one of the corresponding bypass enable bits (BP_1 or BP_2) are selected in stage D2.

In an embodiment, in stage D1, renamer 122 selects and appends only one counter value (CNT_1 or CNT_2) and one corresponding bypass enable bit (BP_1 or BP_2) to an instruction received from pipeline register 500. As will be understood by persons skilled in the relevant arts given the description herein, the number of counter values, the number bits for each counter value and the policy used to determine which counter value is appended to an instruction may vary depending on implementation. In an embodiment, counter values may be determined based on a predetermined look-up table as in Table 1.

It is to be appreciated that for ease of illustration, FIG. 5 illustrates operand availability bits for only one operand of instruction 512, although pipeline registers 502-508 include operand availability bits for both operands of instruction 512.

In stage D2, selection control logic 510 receives operand availability bits avail, inRF, BP_1, BP_2, CNT_1, CNT_2 and active from pipeline register 502. Selection control logic 510 processes operand availability bits based on received broadcasts and transfers the processed operand availability bits to register 504.

Selection control logic 510 monitors CBID broadcasts from producer instructions. If a producer instruction that modifies an operand of instruction 512 is issued into execution stage 306, the producer instruction broadcasts a corresponding CBID and wakeup_en bit that causes selection control logic 510 to set the corresponding active bit to 1.

Selection control logic 510 selects CNT as one of the two counter values CNT_1 and CNT_2 and BP as one of the two corresponding bypass enable bits BP_1 and BP_2. Selection control logic 510 appends CNT and BP to instruction 512. In one embodiment, selection control logic 510 selects one of the two counter CNT_1 and CNT_2 values based on a look-up table as in Table 1. If the active bit is 1, then control logic decrements the selected counter value. If the active bit received from stage D1 is already set as 1, selection control logic 510 continues to decrement a selected count value. If the selected counter value counts down to 0 in stage D2, then selection control logic 510 sets the corresponding BP bit as 1.

Selection control logic 510 sets inRF as 1 if it receives a broadcast that an operand value of instruction 512 has been written into register file 106.

Selection control logic 510 also sets avail as 1 if it receives a broadcast that an operand value of instruction 512 is predictably available in processor 100. The broadcast may also include the location of the operand in processor 100.

After processing operand availability bits, selection control logic 512 passes them onto register 504.

In stage D3, instruction dispatcher 124 receives instruction 512 and it's appended avail, inRF, BP, CNT and active bits from pipeline register 504. Instruction dispatcher 124 stores instruction 512 and its corresponding avail, inRF, BP, CNT and active bits in instruction dispatch buffer 700. When all operands of instruction 512 can be accessed, dispatch controller 130 sends instruction 512 into stage D4 via pipeline register 506.

In stage D3, ID 124 monitors CBID broadcasts from producer instructions. If a producer instruction that modifies an operand of instruction 512 is issued into execution stage 306, the producer instruction broadcasts a corresponding CBID and wakeup_en bit that causes ID 124 to set the corresponding active bit to 1 in IDB 700. If the active bit received from stage D2 is already set as 1, ID 124 continues to decrement the corresponding count value. If the selected counter value counts down to 0 in stage D2, then ID 124 sets BP as 1. In stage D3, if the BP bit for an operand is 1 then it indicates that if the consumer is issued, it will be able to receive bypassed operands from the producer.

In stage D3, if ID 124 receives inRF bit as set to 1 from stage D2, then the operand value is available in register file 106. If inRF is 0, ID 124 sets inRF as 1 only when it receives a broadcast that an operand value of instruction 512 has been written into register file 106.

If the avail bit is 1 it indicates that an operand value for instruction 512 is predictably available in processor 100. If, for example, the producer instruction is a load that has a cache miss and data has be to accessed from main memory or hard disk, then the avail bit is set to 0. When operand data is predictably available in processor 100, for example when data is fetched from main memory or hard disk, a broadcast of corresponding register identification number causes ID 124 to set avail to 1. In embodiments, a CBID or IID may be broadcast to indicate predicable availability upon which avail is set to 1.

In an embodiment, instruction dispatcher 124 determines whether an operand of instruction 512 can be accessed based on the following equation:

$$\text{Operand\_ready} = (\text{inRF OR BP}) \text{ AND avail} \qquad (1)$$

An instruction is ready for issue when all its operand values can be accessed. If instruction 512 has two operands, ID 124 determines whether the instruction is ready for issue according to equation 2 below:

$$\text{Issue\_ready} = \text{Operand\_ready}_{Operand\ 1} \text{ AND Operand\_ready}_{Operand\ 2} \qquad (2)$$

If instruction 512 has N operands, issue readiness is determined by:

$$\text{Issue\_ready} = \text{Operand\_ready}_{Operand\ 1} \text{ AND Operand\_ready}_{Operand\ 2} \text{ AND } \ldots \text{ Operand\_ready}_{Operand\ n} \qquad (3)$$

Example control logic to implement issue_ready is described below with reference to FIG. 8.

In an embodiment, for each operand of an instruction stored in IDB 700 of instruction dispatcher 124, operand readiness and issue readiness are determined as:

$$\text{Operand\_ready} = f_1(\text{inRF}, BP, \text{avail}) \qquad (4)$$

where $f_1$ is a first function.

$$\text{Issue\_ready} = f_2(\text{inRF}, BP, \text{avail}) \qquad (5)$$

where $f_2$ is a second function.

Based on the equations above, when all the operands for instruction 512 are available, dispatch controller 130 issues instruction 512. In one embodiment, if multiple instructions in instruction dispatch buffer 700 are ready for issue, instruction dispatcher 124 in conjunction with dispatch controller 130 issues an instruction based on program order or the age of the instruction i.e. the oldest instruction with available operands is issued first. In an embodiment, instruction dispatcher 124 and dispatch controller 130 may be combined into a single unit.

If instruction 512 is a producer for another instruction, instruction dispatcher 124 appends a wakeup enable (wakeup_en) bit to instruction 512. The wakeup_en bit is broadcast by instruction 512 when it issues into execution stage 306 thereby causing the active bit for the corresponding consumer instruction to be set and thereby starting the consumer instruction's counter. When all operands of instruction 512 can be accessed, instruction 512 is sent by dispatch controller 130 along with an appended wakeup_en bit into stage D4 via pipeline register 506.

In stage D4, control logic (not shown) which may be part of dispatch controller 130 or pipeline control logic 120 broadcasts issue of instruction 512 into instruction execute stage 306. The broadcast may include the instruction 512's IID, CBID and wakeup_en bit. The broadcast by instruction 512 in stage D4 is used to process the operand availability bits for corresponding consumer instructions in stages D1, D2 and D3. In another embodiment, the broadcast by instruction 512 may take place when instruction 512 reaches a specific stage. Instruction 512 again broadcasts its CBIDs and IID if it writes to completion buffer 128 and also when it writes register file 106.

Figure 6:
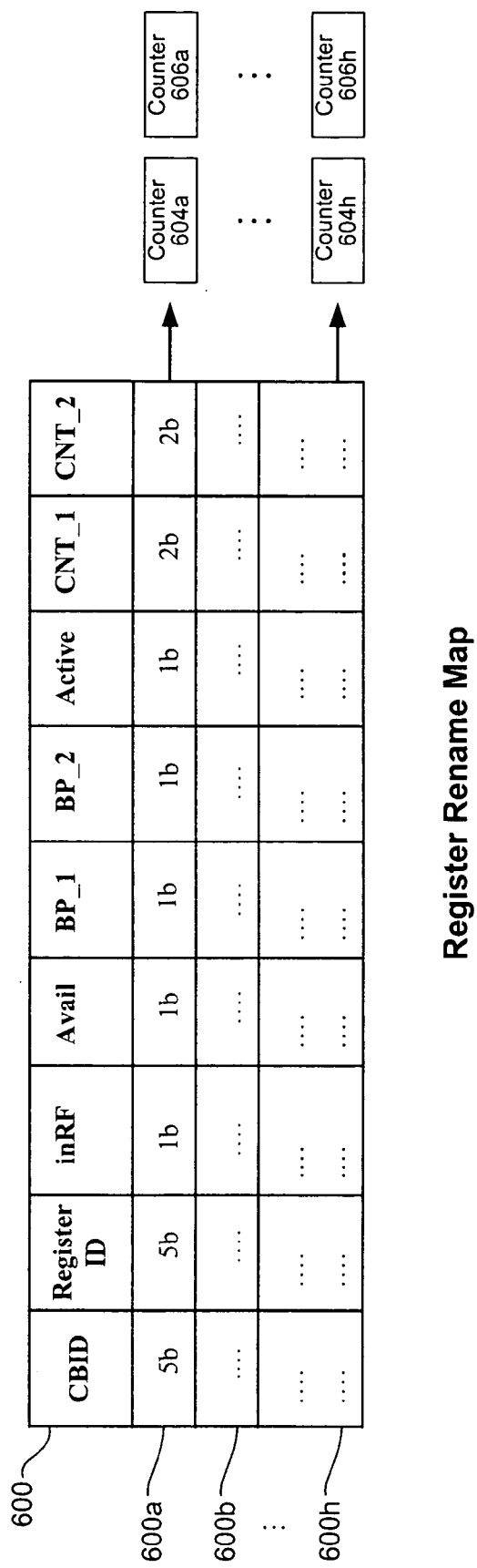
FIG. 6 is a diagram illustrating a register renaming map according to an embodiment of the present invention.

FIG. 6 is a diagram illustrating a renaming map 600 according to an embodiment of the invention. Renaming map 600 is part of renamer 122. In the present embodiment, renaming map 600 includes fields CBID, register identification (ID), inRF, avail, BP_1, BP_2, active, CNT_1 and CNT_2 for each entry. Renaming map 600 may include H entries 602a to 602h (602a-h). In an embodiment, H is the number of registers in register file 106. Registers are identified by register IDs. In an embodiment, register ID is the logical register number. Each register has a unique register ID. Each of entries 600a-h in renaming map 600 has two associated counters, counters 604a-h and counters 606a-h. Counters 600a-h and counters 606a-h are part of renamer 122 and/or renaming control logic (not shown). CBID is 5 bits, register ID is 5 bits, inRF is 1 bit, avail is 1 bit, active is 1 bit, CNT_1 is 2 bits, CNT_2 is 2 bits and BP_1 and BP_2 are 1 bit each. As will be understood by persons skilled in the relevant arts given the description herein, the number of bits for each field in renaming map 600 is arbitrary and depends upon implementation. In an embodiment, counters 604a-h and counters 606a-h are part of renaming control logic (not shown). Renaming map 600 may include other fields (not shown).

Use of renaming map 600 helps in reducing the dependency check complexity of out-of-order processor 100. Register renaming is done by renamer 122 to allow for avoid conflicts between different instructions attempting to write to the same register in register file 106. Processors using register renaming typically have a set of internal registers, such as completion buffer 128, to queue the results before they are written into a register file, such as register file 106. Register renaming allows multiple accesses to the same register in register file 106 to be mapped to different internal registers in completion buffer 128, thereby resolving the conflicts. Every renaming entry in renaming map 600 has the CBID of the latest provider for a register and thus every consumer knows from which producer its operands will come from. As described, herein, renaming map 600 is modified to store operand availability bits thereby obviating the need for a centralized scoreboard. Appropriate operand availability bits are appended to consumer instructions when they pass through stage D1.

When instruction 512 enters stage D1 (shown in FIG. 5), renamer 122 extracts the destination register ID from instruction 512. A CBID is also assigned to the destination register ID. Renamer 122 looks up the corresponding register ID in renaming map 600 and updates the entry with the CBID of the destination register, sets avail as 1 (assuming that the data will be predictably available), inRF as 0 (since instruction 512 has not written to the destination register in register file 512), active as 0 (since instruction 512 has not yet been issued into execute stage 306), BP_1 and BP_2 as 0, (since counters associated with the destination register have not started counting) and CNT_1 and CNT_2 are initialized from values in table 1.

For the source operands of instruction 512, renamer 122 looks up corresponding register IDs in renaming map 600 and appends corresponding avail, inRF, active, BP, CNT_1 and CNT_2 values for each source operand of instruction 512. In an embodiment, renamer 122 also appends corresponding CBIDs to instruction 512. If an instruction does not have source operands, for example a store instruction with an immediate value, then no bits are appended to instruction 512.

Figure 7:
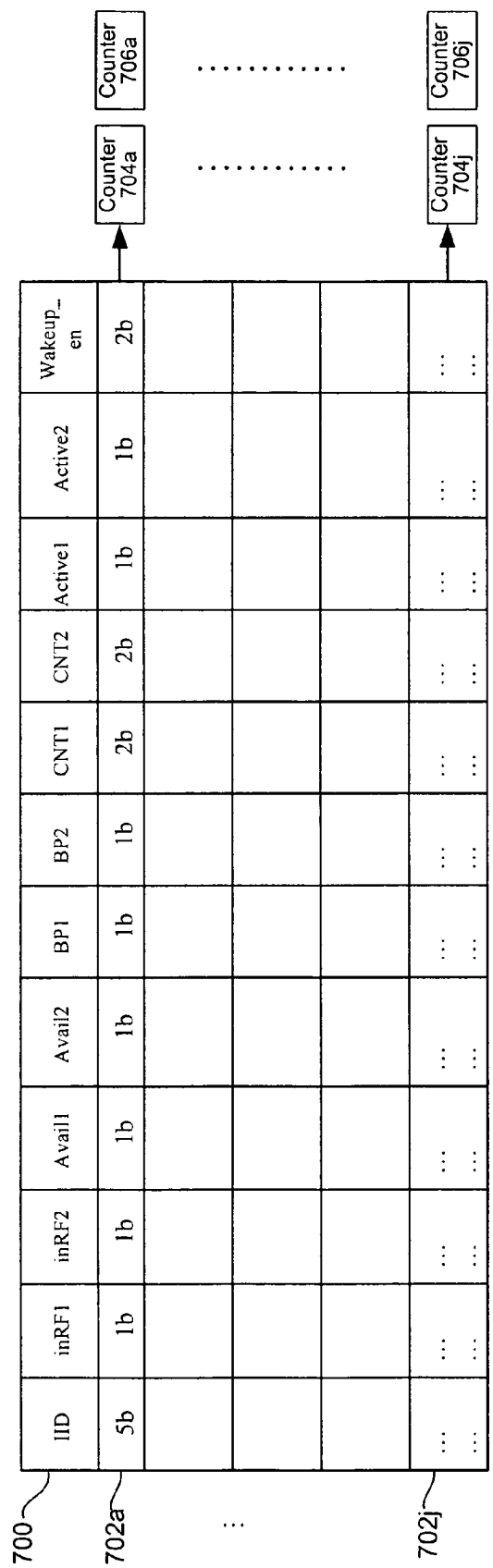
FIG. 7 is a diagram illustrating an instruction dispatch buffer according to an embodiment of the present invention.

FIG. 7 is a diagram illustrating instruction dispatch buffer (IDB) 700 according to an embodiment of the invention. IDB 700 is part of instruction dispatcher 124. In the present embodiment, IDB 700 includes fields inRF1, avail1, active1, CNT1 and BP1 for a first operand of an instruction and inRF2, avail2, active2, CNT2 and BP2 for a second operand of the instruction, an instruction identification field (IID) and a wakeup enable (wakeup_en) field. IDB 700 may include J entries 702a to 702j (702a-j). In an embodiment, IDB 700 holds 6 instructions at a time and J is 6. Instructions are identified by IIDs. Each instruction has a unique IID that is assigned in, for example, stage D1 (in FIG. 5). IDB 700 may also include fields for CBIDs (not shown) for each instruction's source and destination operands. Each instruction in IDB 700 is assigned one of entries 702a-j. Each of entries 702a-j in IDB 700 has a corresponding counter 704a-j and combinational logic 706a-j. Counters 704a-j and combinational logic 706a-j may be part of instruction dispatcher 124 or instruction dispatch control logic (not shown). IID is 5 bits, inRF1, inRF2, avail1, avail2, BP1, BP2, active1 and active2 are 1 bit each, CNT1, CNT2 and wakeup_en are 2 bits each. As will be understood by persons skilled in the relevant arts given the description herein, the number of bits for each field in IDB 700 is arbitrary and depends upon implementation. IDB 700 may include other fields (not shown).

When an instruction enters stage D3 (shown in FIG. 5), ID 124 stores the instruction's corresponding operand availability bits in IDB 700. IDB 700 is organized based on IIDs. ID 124 assigns a wakeup_en value to each instruction entry in IDB 700 based on whether the instruction is a producer and whether the instruction is the latest producer for an operand at that time. An instruction may not be a producer or an instruction may not be the latest producer for the operand that it modifies. Examples of wakeup_en are described below.

IDB 700 stores instructions that are waiting to be issued by dispatch controller 130. The instructions in IDB 700 are stored until their operands are available and until dispatch controller 130 schedules them for issue. Table 2 below illustrates example status of an operand based on avail, inRF and BP bits.

TABLE 2

| Avail | inRF | BP | Operand Status Description | Operand Availability |
|---|---|---|---|---|
| 0 | 0 | 0 | Not possible | N/A |
| 0 | 0 | 1 | Producer may be a load miss | No |
| 0 | 1 | 1 | Producer may be a load miss that is fetching data from main memory or hard disk | No |
| 0 | 1 | 0 | Not Possible | N/A |
| 1 | 0 | 0 | Producer issued, counter has started but producer has not yet reached a bypassable stage | No |
| 1 | 0 | 1 | Producer issued and has reached a bypassable stage | Yes |
| 1 | 1 | 0 | Not possible | N/A |
| 1 | 1 | 1 | Producer has completed write to register file | Yes |

In the case of processor 200, there are 2 IDBs, one each in ID 124a and ID 124b. In processor 200, one IDB (not shown) is associated with the AGEN 126a pipeline and another IDB (not shown) is associated with the ALU 126b pipeline.

The instructions waiting to be issued in IDB 700 are tested for operand availability on each clock cycle. In an embodiment, a logical combination of inRF, avail and BP bits using equation (2) determines whether the operands are available and whether the instruction is ready for issue. Example combinational logic implementing equation (2) to test operand and dispatch readiness is illustrated in FIG. 8. The oldest instruction in IDB 700 is selected by dispatch controller 130 from among all the instruction in IDB 700 which have available operands. Alternatively, dispatch controller 130 may schedule instruction issue based on a different scheme. In an embodiment dispatch controller 130 is part of ID 124.

Upon issue into execution stage 306, an instruction wakes up the counters of its consumer instructions in IDB 700, renaming map 700 and stage D2 (shown in FIG. 5). This is done by broadcasting the corresponding CBID(s) and the wakeup_en bit of the issued instruction. As a result of the broadcast, renamer 122 in stage D1, selection control logic 510 in stage D2 and IDB 700 in stage D3, set the active bit to 1 if, in the respective pipeline stage, a consumer instruction's operand's corresponding CBID matches the broadcast CBID. When active is set to 1, the corresponding counter will start to count and when it reaches zero, the corresponding BP bit is set to 1, and the operand is available for bypass.

In write to register file stage 308, destination operand data of producer instructions is written from CBID 128 into register file 106. The write to register file 308 results in a broadcast of the CBID and register ID for the register written thereby changing operand availability bits for corresponding entries in IDB 700 in stage D1, renaming map 600 in stage D2 and in stage D3. If there is a match between source operand CBIDs and broadcast CBIDs of registers written to register file 106, then IDB 700 sets inRF bits for corresponding source operands as 1 since the operands are now available in register file 106.

In an embodiment, IDB 700, renamer 124 and selection control logic 510 compare source operand CBIDs in their respective pipeline stages against the CBIDs broadcast when an instruction writes to completion buffer 128. If there is a match between source operand CBIDs and broadcast CBIDs then IDB 700, renamer 124 and selection control logic 510 set inRF and avail bits for corresponding source operands as 1 since the operands are now predictably available (even though they have not yet been written to register file 106).

For producer instructions with a long latency for completion (such as a multiply instruction) renamer 122 sets the avail bit as 0 in renaming map 600 for the operand to be modified by the long latency instruction. The avail bit is set to 1 in IDB 700, renaming map 600 and in stage D2 only when the operand modified by a long latency producer is predictably available in processor 100 and a broadcast by the long latency producer indicates predictable availability of an operand.

The wakeup_en value stored for each instruction in IDB 700 is appended to the instruction by ID 124. When an instruction is issued from IDB 700 by dispatch controller 130, the wakeup_en bit is propagated with the instruction. For example, in FIG. 5, instruction 512 is appended with a wakeup_en value and propagated into stage D4 via register 508.

Wakeup_en, along with a corresponding CBID, is broadcast by a producer instruction entering instruction execute stage 306. Broadcast of wakeup_en sets active bits of corresponding source operands in IDB 700, renaming map 600 and in stage D2, to 1. Depending on the value of wakeup_en, active bits may not be set at all or setting of the active bits may be delayed. For example, if wakeup_en is 00, then the counter is not started. If wakeup_en is 01, active bits are set to 1 in the same cycle and the counter is started. If wakeup_en is 10 then counters are started after a predetermined time period and active bits are also set to 1 after the predetermined time period (e.g. two clock cycles). If wakeup_en is 11, counters are started after another predetermined time and active bits are set to 1 after the predetermined time period (e.g. four clock cycles). Delaying the setting of active bits to 1 delays the activation of corresponding counters and consequently delays the issue of consumer instructions. In an embodiment, ID 124 looks up a table of wakeup_en values, as in Table 3 below, based on type of a producer instruction:

TABLE 3

| Instruction Type | Wakeup_en |
|---|---|
| Add | 01 |
| Multiply | 10 |
| Divide | 11 |

Wakeup_en values for an instruction may change after it is issued by ID 124. For example, if a producer instruction is invalidated, its wakeup_en may be set to 00 by, for example, pipeline control logic 120.

In an embodiment, long latency instructions broadcast a wakeup_en bit value to delay setting of the active bits of corresponding consumer source operands. Typically, a long latency instruction broadcasts its wakeup_en value and corresponding CBID upon issue into execution stage 306.

In the case of unpredictable producer instructions, such as a load instructions that have a cache miss, a corresponding CBID broadcast causes the avail bits of corresponding consumer source operands in IDB 700, renaming 600 and stage D2 to be set to 0 to indicate that the load has missed and the operand value is unavailable.

IDB 700 is also updated due to instruction kills. Instruction kills may occur, for example if a branch mispredicts or an exception occurs. In multithreading cases, an instruction kill invalidates the instruction in that thread. For non-multithreading case, all the entries in IDB 700 are removed on a pipeline flush and renaming map 600 is reset. In multithreading cases, certain threads may be killed and their corresponding entries in IDB 700 and corresponding renaming maps are reset.

Figure 8:
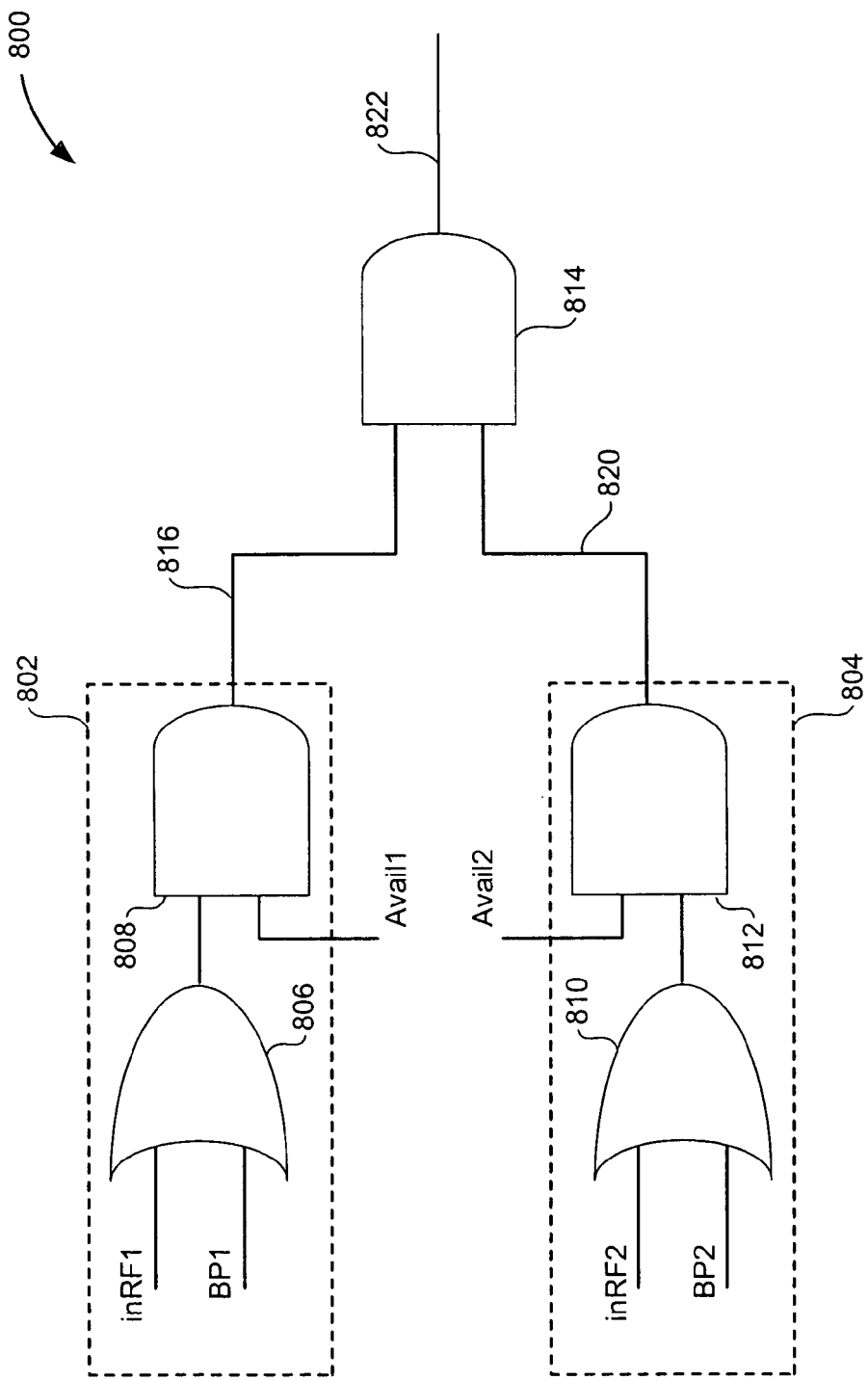
FIG. 8 is a diagram illustrating combinational logic according to an embodiment of the present invention.

FIG. 8 is a diagram illustrating a circuit 800 according to an embodiment of the invention. Circuit 800 is an example implementation of combinational logic 706. Circuit 800 is used to test whether an instruction is ready for issue by ID 124. Circuit 800 may be used to implement equation 2. Circuit 800 includes circuits 802 and 804 which are used to determine if source operands of an instruction are available. Each of circuits 802 and 804 may be used to implement equation 1.

Circuit 802 comprises OR gate 806 and AND gate 808. OR gate 806 receives inputs inRF1 and BP1 of the first source operand of an instruction from IDB 700. The result of OR gate 806 is fed as an input into AND gate 808. AND gate 808 also receives avail1 as an input from IDB 700. Output 816 of AND gate 808 indicates availability of the first source operand of an instruction. In an example, if output 816 is 0 it indicates that the first source operand is not available and if output 816 is 1 it indicates that the first source operand is available.

Similar to circuit 802, circuit 804 comprises OR gate 810 and AND gate 812. OR gate 810 receives inputs inRF2 and BP2 of the second source operand of an instruction from IDB 700. The result of OR gate 810 is fed as an input into AND gate 812. AND gate 812 also receives avail2 as an input from IDB 700. Output 820 of AND gate 812 indicates availability of the second source operand of an instruction. In an example, if output 820 is 0 it indicates that the second source operand is not available and if output 820 is 1 it indicates that the second source operand is available.

Outputs 816 and 820 of circuits 802 and 804 respectively are fed as inputs to AND gate 814. Output 822 of AND gate 814 indicates whether an instruction is ready for issue.

Figure 9:
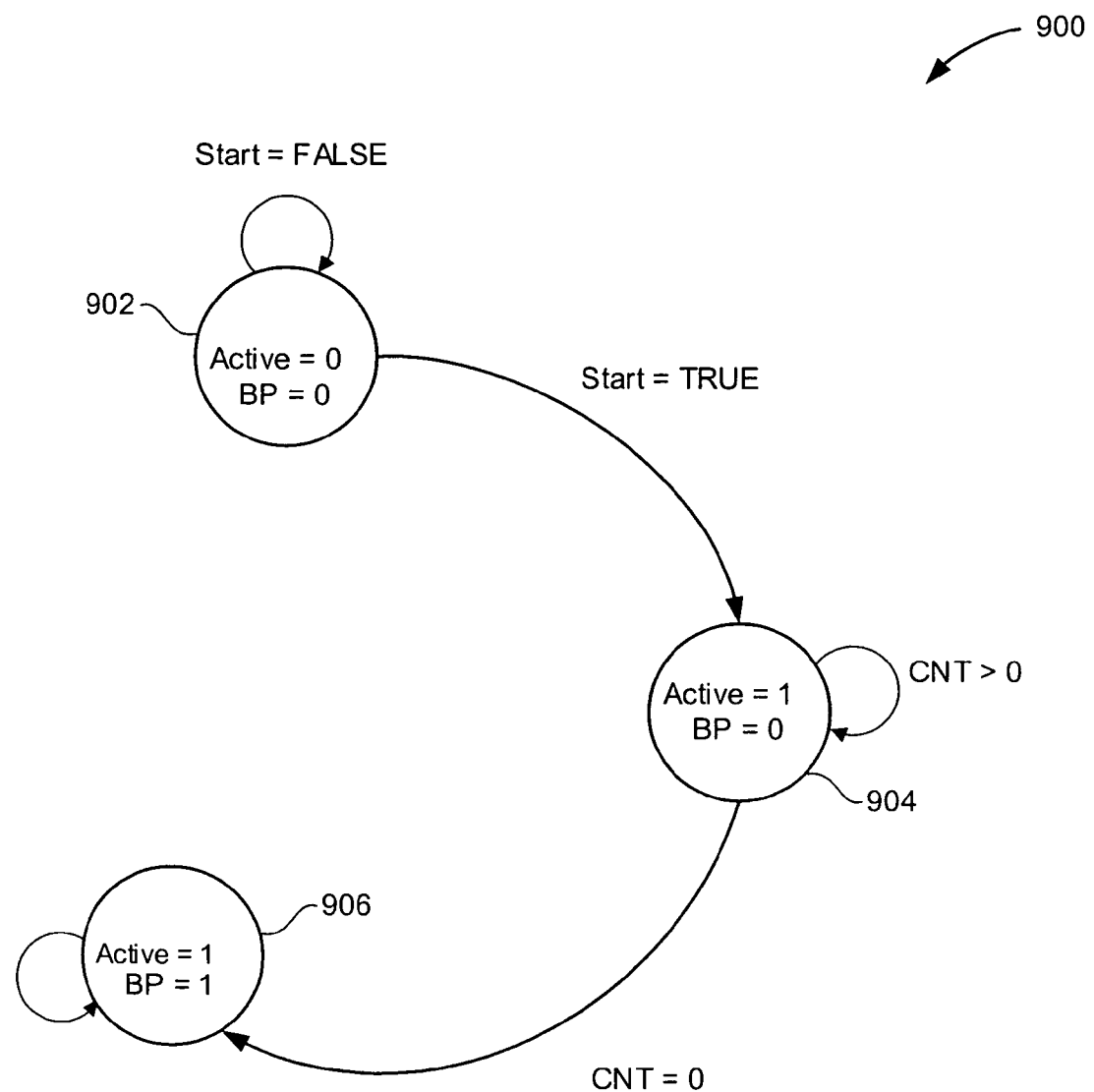
FIG. 9 is a diagram illustrating a state machine according to an embodiment of the present invention.

FIG. 9 illustrates a state machine 900 used to control the active and BP bits of a consumer instruction according to an embodiment of the invention. State machine 900 may be part of ID 124 and is replicated for each entry in IDB 700. State machine 900 may also be part of renamer 700, and selection control logic 510. State machine 900 comprises three states 902, 904 and 906.

In state 902, active is 0 and BP is 0 while start is false. Start is a flag that is based upon the value of wakeup_en. By default start is false and is dependent on a wakeup_en broadcast of a producer instruction. For example, if a producer broadcasts wakeup_en as 00, start remains false. If wakeup_en is broadcast as 01, start is set as true in the same clock cycle. If wakeup_en is 10, start is set as true 2 clock cycles after receiving the broadcast. If wakeup_en is 11, start is set as true four cycles after receiving the broadcast. The number of cycles and example wakeup_en values are arbitrary and may change according to implementation. When start is set as true, control transitions to state 904.

In state 904, the active bit of the corresponding source operand is set as 1 and the corresponding counter is activated. The counter decrements the corresponding count value (CNT) every cycle. An example counter is described below with reference to FIG. 10. Control remains in state 904 while CNT is greater than 0. The bypass enable bit BP is also zero in state 904. When CNT is 0, control transfers to state 906.

In state 906, since CNT is 0, BP is set as 1 and the corresponding consumer instruction can be issued so as to receive a bypassed operand value from the producer instruction before execution. Control stays in state 906 until it is reset back to state 902 for the next instruction.

State machine 900 may be implemented in hardware, software and firmware or any combination thereof.

FIG. 10 is a diagram illustrating an example embodiment of a counter 1000 according to an embodiment of the invention. Counter 1000 may be used in renamer 600, IDB 700 and selection control logic 510 to count down a count value of a consumer source operand upon receiving a broadcast from a corresponding producer instruction. Counter 1000 is initialized with an initial count value by renamer 600 or in stage D2 by control logic 510. Counter 1000 includes four shift registers 1002a-d. Each shift register 1002 comprises a set input (S), a reset input (R), a clock input (CLK), data input (IN) and data output Q. In the present embodiment, each shift register 1000 receives the same clock signal CLK_IN 1006. Each shift register may be initialized with the initial count value either via data input (IN) or via the set and reset inputs. Once counter 1000 is activated it decrements the count value by shifting a bit to the right each cycle. In an embodiment, when least significant shift-register 1002d receives a 1 and shift-registers 1002a-c are 0, the corresponding BP bit is set as 1.

In embodiments presented herein, example instructions have two source operands and one destination operand. In other embodiment, instructions have one or more source operands and multiple destination operands. Operand availability bits avail, inRF, active, BP and counter values are also referred to as a local or distributive scoreboard since they are appended to an instruction and propagated through multiple pipeline stages of processor 100. Although not shown for simplifying explanation, it is to be appreciated that CBIDs for source operands and destination operand, IIDs and register IDs may also be propagated through multiple pipeline stages. In an embodiment, broadcasts by a producer instruction may include the instruction's CBID as well as the CBID of the operand being modified. In examples presented herein, the count value is 2 bits to limit size of counters and registers. It is to be appreciated that the size of count value is arbitrary and depends upon implementation.

While the foregoing is a complete description of exemplary embodiments of the invention, it should be evident that various modifications, alternatives, and equivalents may be made and used. It is also to be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. An hardware instruction dispatch unit for a processor that executes instructions in an instruction pipeline having a plurality of stages, the instruction dispatch unit comprising:
control logic that appends a plurality of operand availability bits to an instruction;
an instruction buffer that stores the instruction and the plurality of operand availability bits; and
an instruction dispatcher that determines when the instruction is issued to an execution unit of the processor based, at least in part, on the plurality of operand availability bits stored in the instruction buffer, wherein the plurality of operand availability bits are propagated together with the instruction through at least one stage of the instruction pipeline and wherein the plurality of operand availability bits include a value to predict availability of a source operand of the instruction in a completion buffer, and wherein the plurality of operand availability bits include a value to activate a counter.

2. The instruction dispatch unit of claim 1, wherein the operand availability bits are propagated together with the instruction through a plurality of stages of the instruction pipeline.

3. The instruction dispatch unit of claim 1, wherein the plurality of operand availability bits include a counter value.

4. The instruction dispatch unit of claim 1, wherein the plurality of operand availability bits include a value to indicate availability of a source operand of the instruction in a register.

5. The instruction dispatch unit of claim 4, wherein the register is one of a general purpose register, an accumulator register and a co-processor register.

6. The instruction dispatch unit of claim 1, wherein the control logic includes a renaming map.

7. A hardware processor core, comprising:
an instruction dispatch unit that includes:
control logic that appends a plurality of operand availability bits to an instruction;
an instruction buffer that stores the instruction and the plurality of operand availability bits;
an instruction pipeline having a plurality of stages; and
an instruction dispatcher that determines when the instruction is issued to an execution unit of the processor based, at least in part, on the plurality of operand availability bits stored in the instruction buffer, wherein the plurality of operand availability bits are propagated together with the instruction through at least one stage of the instruction pipeline and wherein the plurality of operand availability bits include a value to predict availability of a source operand of the instruction in a completion buffer, and wherein the plurality of operand availability bits include a value to activate a counter.

8. The processor core of claim 7, wherein the operand availability bits are propagated together with the instruction through a plurality of stages of the instruction pipeline.

9. The processor core of claim 7, wherein the plurality of operand availability bits include a counter value.

10. The processor core of claim 7, wherein the plurality of operand availability bits include a value to indicate availability of a source operand of the instruction in a register.

11. The processor core of claim 10, wherein the register is one of a general purpose register, an accumulator register and a co-processor register.

12. The processor core of claim 7, wherein the control logic includes a renaming map.

13. A computer-readable storage medium having embodied thereon computer-readable program code to generate a processor core having an out-of-order pipeline, the processor core comprising:
an instruction dispatch unit that includes:
control logic that appends a plurality of operand availability bits to an instruction;
an instruction buffer that stores the instruction and the plurality of operand availability bits; and
an instruction dispatcher that determines when the instruction is issued to an execution unit of the processor based, at least in part, on the plurality of operand availability bits stored in the instruction buffer, wherein the plurality of operand availability bits are propagated together with the instruction through at least one stage of the out-of-order pipeline and wherein the plurality of operand availability bits include a value to predict availability of a source operand of the instruction in a completion buffer, and wherein the plurality of operand availability bits include a value to activate a counter.

14. The computer readable storage medium of claim 13, wherein the operand availability bits are propagated together with the instruction through a plurality of stages of the out-of-order pipeline.

15. The computer readable storage medium of claim 13, wherein the plurality of operand availability bits include a counter value.

16. The computer readable storage medium of claim 13, wherein the plurality of operand availability bits include a value to indicate availability of a source operand of the instruction in a register.

17. The computer readable storage medium of claim 16, wherein the register is one of a general purpose register, an accumulator register and a co-processor register.

18. The computer readable storage medium of claim 13, wherein the control logic includes a renaming map.

19. The computer readable storage medium of claim 13, wherein the processor core is embodied in hardware description language software.

20. The computer readable storage medium of claim 13, wherein the processor core is embodied in Verilog hardware description language software.

21. The computer readable storage medium of claim 13, wherein the processor core is embodied in VHDL hardware description language software.

22. A hardware processor core comprising:
an instruction dispatch unit that includes:
control logic that associates a plurality of operand availability bits with an instruction;
an instruction buffer that stores the instruction and the plurality of operand availability bits;
an instruction pipeline having a plurality of stages; and
an instruction dispatcher that determines when the instruction is issued to an execution unit of the processor based, at least in part, on the plurality of operand availability bits stored in the instruction buffer, wherein the plurality of operand availability bits are propagated together with the instruction through at least one stage of the instruction pipeline and wherein the plurality of operand availability bits include a value to predict availability of a source operand of the instruction in a completion buffer, and wherein the plurality of operand availability bits include a value to activate a counter.

23. The processor core of claim 22, wherein the operand availability bits are propagated together with the instruction through a plurality of stages of the instruction pipeline.

24. The processor core of claim 22, wherein the plurality of operand availability bits include a counter value.

25. The processor core of claim 22, wherein the plurality of operand availability bits include a value to indicate availability of a source operand of the instruction in a register.

26. The processor core of claim 25, wherein the register is one of a general purpose register, an accumulator register and a co-processor register.

27. The processor core of claim 22, wherein the control logic includes a renaming map.

* * * * *

UNITED STATES PATENT AND TRADEMARK OFFICE
CERTIFICATE OF CORRECTION

| | | |
|---|---|---|
| PATENT NO. | : 7,721,071 B2 | Page 1 of 1 |
| APPLICATION NO. | : 11/362764 | |
| DATED | : May 18, 2010 | |
| INVENTOR(S) | : Xing Yu Jiang | |

It is certified that error appears in the above-identified patent and that said Letters Patent is hereby corrected as shown below:

Title Page, Item (54) Title section, please replace "System and Method for Propagating Operand Availability Prediction Bits With Instructions Through a Pipeline in an Out-of-Order Processor" with --System and Method for Propagating Operand Availability Identifiers with Instructions With Prediction Through a Pipeline in an Out-of-Order Processor--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,721,071 B2
APPLICATION NO. : 11/362764
DATED : May 18, 2010
INVENTOR(S) : Xing Yu Jiang It is certified that error appears in the above-identified patent and that said Letters Patent is hereby corrected as shown below:

Title Page, Item (54) and at Column 1, lines 1-5, Title section, please replace "System and Method for Propagating Operand Availability Prediction Bits With Instructions Through a Pipeline in an Out-of-Order Processor" with --System and Method for Propagating Operand Availability Identifiers with Instructions With Prediction Through a Pipeline in an Out-of-Order Processor--.

This certificate supersedes the Certificate of Correction issued July 20, 2010.

Signed and Sealed this

Seventeenth Day of August, 2010

David J. Kappos
*Director of the United States Patent and Trademark Office*